United States Patent
Ogami et al.

(10) Patent No.: US 8,880,972 B2
(45) Date of Patent: Nov. 4, 2014

(54) SERIAL TRANSMISSION APPARATUS, INFORMATION PROCESSING APPARATUS, AND SERIAL TRANSMISSION METHOD

(75) Inventors: Shogo Ogami, Kawasaki (JP); Kenji Shirase, Kawasaki (JP); Tatsuhiko Negishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 13/270,292

(22) Filed: Oct. 11, 2011

(65) Prior Publication Data

US 2012/0093211 A1 Apr. 19, 2012

(30) Foreign Application Priority Data

Oct. 15, 2010 (JP) ................. 2010-232105

(51) Int. Cl.
*H04L 1/18* (2006.01)
*H04L 12/841* (2013.01)
*H04L 1/00* (2006.01)

(52) U.S. Cl.
CPC ......... *H04L 1/188* (2013.01); *H04L 2001/0093* (2013.01); *H04L 47/283* (2013.01); *H04L 1/1874* (2013.01)
USPC .......................................... 714/749; 370/328

(58) Field of Classification Search
CPC ...... H04L 1/188; H04L 1/1848; H04L 1/1974
USPC .................. 714/748, 749; 370/328
See application file for complete search history.

(56) References Cited

U.S. PATENT DOCUMENTS

| | | | | |
|---|---|---|---|---|
| 5,410,536 | A * | 4/1995 | Shah et al. | 370/216 |
| 6,473,399 | B1 * | 10/2002 | Johansson et al. | 370/229 |
| 7,068,619 | B2 * | 6/2006 | Balachandran et al. | 370/328 |
| 7,898,962 | B2 * | 3/2011 | Hiddink et al. | 370/236 |

FOREIGN PATENT DOCUMENTS

| | | |
|---|---|---|
| JP | 61-248637 | 11/1986 |
| JP | 2-285752 A | 11/1990 |
| JP | 10-336274 | 12/1998 |

OTHER PUBLICATIONS

Fairhurst, G. et al., "Advice to link designers on link Automatic Repeat reQuest (ARQ)" Network Working Group, The Internet Society, Aug. 2002, pp. 1-27.
Wang, F. et al., "Improving TCP Performance over Mobile Ad-Hoc Networks with Out-of-Order Detection and Response", Proceedings of the 3rd ACM International Symposium on Mobile Ad Hoc Networking and Computing, Jun. 9, 2002, pp. 217-225.
Extended European Search Report dated Dec. 23, 2011 for corresponding European Patent Application No. 11184786.9.
Japanese Office Action mailed Jul. 15, 2014 for corresponding Japanese Patent Application No. 2010-232105, with Partial English Translation, 6 pages.

* cited by examiner

*Primary Examiner* — Sam Rizk
(74) *Attorney, Agent, or Firm* — Fujitsu Patent Center

(57) ABSTRACT

A serial transmission apparatus, which transmits data through a serial communication line, includes a transmission unit configured to transmit data stored in a transmission data buffer to a transmission destination apparatus, a time-out detector configured to detect a time out when a response to the transmitted data from the transmission destination apparatus is not received within a specified period of time, a recovery state detector configured to detect a recovery state representing that the serial communication line is in a link recovery process, and a retransmission request unit configured to request the transmission unit to transmit again the data which has been stored in the transmission data buffer when the time-out detector detects the time-out or when the recovery state detector detects the recovery state of the serial communication line.

13 Claims, 15 Drawing Sheets

SERIAL TRANSMISSION APPARATUS, INFORMATION PROCESSING APPARATUS, AND SERIAL TRANSMISSION METHOD

CROSS-REFERENCE TO RELATED APPLICATION

This application is based upon and claims the benefit of priority of the prior Japanese Patent Application No. 2010-232105, filed on Oct. 15, 2010, the entire contents of which are incorporated herein by reference.

FIELD

The embodiments discussed herein are related to a serial transmission apparatus, an information processing apparatus, and a serial transmission method.

BACKGROUND

FIG. 10 is a diagram illustrating a system configuration and a layer configuration of a general serial transmission apparatus which performs serial transmission. In FIG. 10, an apparatus 110 and an apparatus 210 are connected to each other through a serial communication line 310 and perform data transmission/reception through the serial communication line 310.

Examples of a serial transmission method include a method having a three-layer structure. In the example illustrated in FIG. 10, each of the apparatuses 110 and 210 has a physical layer, a link layer, and an upper layer. Here, the physical layer controls transmission/reception of a communication packet through the serial communication line 310. The link layer logically controls data transmission/reception through the serial communication line 310. The upper layer generates a communication packet and obtains communication data from and supplies communication data to software. A data transfer method using PCI Express which is a concrete example of the transfer method having a three-layer structure has a physical layer (PL), a data link layer (DLL), and a transaction layer (TL) for example.

The physical layer performs data transfer between the link layer and the serial communication line and performs a control process for establishment of a connection of the serial communication line. The control process performed on the serial communication line includes a link recovery process performed when an error occurs in the serial communication line.

The link layer performs control for ensuring data transmission between a pair of apparatuses. The link layer receives a transaction layer packet (TLP) from the upper layer and adds a sequence number (SEQ) to the TLP. Data of the TLP including the sequence number added thereto is transmitted to the counterpart apparatus through the physical layer.

The link layer has, in addition to a function of transmitting the TLP, a function of determining completion of a transmission in accordance with a normal/abnormality notification, a function of detecting a time-out, and a function of transmitting data again as data transmission functions. Furthermore, the link layer has, in addition to a function of receiving data, a function of determining whether received data is normal or abnormal and transmitting a result of the determination as a normal/abnormality notification to the counterpart apparatus as a data reception function. Each of the apparatuses may serve as a data transmitter and a data receiver, and therefore, the link layer included in each of the apparatuses has the data transmission function and the data reception function. Since the link layer has the data transmission function and the data reception function, data transmission is more reliably performed. Hereinafter, the data transmission function and the data reception function of the link layer will be described in detail.

The normal/abnormality notification generated by the link layer is transmitted to the counterpart apparatus using a data link layer packet (DLLP) used to manage a transmission path (link). As a normality notification, that is, an affirmative response used for a notification of normal reception of one or more TLPs, an ACK DLLP is used. As an abnormality notification, that is, a negative response used to request retransmission of a TLP, a NAK DLLP is used.

A reception apparatus determines whether a received TLP is normal and notifies a transmission apparatus of a result of the determination using an ACK/NAK DLLP. When successfully receiving the TLP, the reception apparatus adds a sequence number of the latest TLP which has been successfully received to ACK DLLP and transmits the ACK DLLP to the transmission apparatus.

In the transmission apparatus, the TLP transmitted through the physical layer is stored in a retry buffer, a transmission buffer, or the like until transmission confirmation is performed using the ACK/NAK DLLP supplied from the reception apparatus. The TLP stored in the retry buffer is used for retransmission of the TLP to be performed when the reception apparatus does not successfully receive the TLP.

When receiving the ACK DLLP from the reception apparatus, the transmission apparatus discards a TLP in which a transmission thereof is confirmed by the ACK DLLP among TLPs stored in the retry buffer. Specifically, a TLP having a sequence number notified using the ACK DLLP and TLPs having sequence numbers before the sequence number notified using the ACK DLLP are discarded. When receiving the NAK DLLP from the reception apparatus, the transmission apparatus discards a TLP in which a transmission thereof is confirmed from the retry buffer and TLPs in which transmissions thereof are not confirmed, that is, TLPs remaining in the retry buffer are transmitted again. After the TLP which has been transmitted is discarded from the retry buffer, a buffer region of the retry buffer corresponding to the discarded TLP is released.

In the transmission apparatus, when a transmission confirmation is not returned from the transmission destination apparatus within a specified period of time after the transmission of the TLP, the TLPs stored in the retry buffer in which transmissions thereof have not been confirmed are transmitted again in an order from the oldest TLP.

In the transmission apparatus, when a transmission confirmation is not transmitted from the transmission destination apparatus even though a retransmission of the TLP is performed several times, it is determined that a link is not working normally. In this case, the link layer of the transmission apparatus instructs the physical layer to perform a retraining process on the link. The physical layer which received the instruction for the re-training causes a state machine which manages a link state to enter a recovery state so that a link recovery process is performed to recover the link to a normal state.

The reception apparatus transmits a NAK DLLP when the physical layer detects an error or when a Cyclic Redundancy Check (CRC) error is detected. When the sequence number of the received TLP is equal to or smaller than a sequence number to be received next, the reception apparatus transmits an ACK DLLP. When the sequence number of the received TLP is equal to or smaller than the sequence number to be received next, the received TLP is determined as an overlapped received TLP and is discarded. When the sequence number of the received TLP is larger than the sequence number to be received next, the reception apparatus transmits a NAK DLLP.

By the DLLP response process, the TLP retransmission process, and the like, performed by the transmission apparatus and the reception apparatus described above, more reliable data transmission is performed. A description will be made with reference to FIGS. 11 to 13 hereinafter.

FIG. 11 is a diagram illustrating a processing flow performed when data transmission is successfully performed. In FIG. 11, the upper layer is denoted by "TL", the link layer is denoted by "DLL", and the physical layer is denoted by "PL". FIG. 11 is a diagram illustrating TLs, DLLs, and PLs of a transmission apparatus A and a reception apparatus B and illustrating performance of data transmission and response. An axis of abscissa illustrated in FIG. 11 denotes a time axis.

In FIG. 11, the apparatus A generates data (TLP) in the TL at a time T1, adds a sequence number (SEQ) "10" to the generated TLP in the DLL, and transmits the TLP to the apparatus B through the PL. The apparatus B successfully receives the TLP transmitted from the apparatus A at a time T2 and transmits an ACK DLLP response representing that a result of the reception is normal and the sequence number "10" to the apparatus A. When receiving the ACK DLLP response supplied from the apparatus B at a time T3, the apparatus A recognizes that a data transmission process corresponding to the sequence number "10" has been successfully performed. Thereafter, the apparatus A adds a sequence number "11" to a TLP transmitted next, and transmits the TLP to the apparatus B. By a similar procedure, the apparatus A receives an ACK DLLP response from the apparatus B at a time T6, and a data transmission process corresponding to the sequence number "11" is completed.

FIG. 12 is a diagram illustrating a processing flow performed when an error occurs in data transmission. The apparatus A adds a sequence number "10" to a TLP and transmits the TLP to the apparatus B at a time T1. However, when a CRC error occurs for some reason in the transmission path, it is likely that data transmitted from the apparatus A is not successfully received by the apparatus B at a time T2. In this case, the apparatus B transmits a NAK DLLP response representing that the TLP has not been successfully received by the apparatus A. A sequence number "9" of a TLP which is the last TLP which has been successfully received by the apparatus B is added to the NAK DLLP response.

When receiving the NAK DLLP response at a time T3, the apparatus A recognizes that the transmission of the TLP corresponding to the sequence number "10" has not been successfully performed, and transmits the TLP which has been stored in the retry buffer again at a time T4. The TLP which is transmitted again at a time T4 is successfully received by the apparatus B at a time T5, and the apparatus B transmits an ACK DLLP response to the apparatus A. Thereafter, the apparatus A receives the ACK DLL response from the apparatus B at a time T6, and a data transmission process corresponding to the sequence number "10" is completed.

FIG. 13 is a diagram illustrating a processing flow performed when a time-out occurs in data transmission. The apparatus A adds a sequence number "10" to a TLP and transmits the TLP to the apparatus B at a time T1. The apparatus B successfully receives the TLP from the apparatus A at a time T2 and transmits an ACK DLLP response to the apparatus A at a time T3. However, it is possible that the ACK DLLP response disappears for some reason in the link path. In this case, when the apparatus A recognizes that a specified period of time has been elapsed using a timer counter or the like, a time-out (T.O.) occurs (at a time T4).

When the time-out occurred in the apparatus A, that is, when a transmission confirmation is not transmitted from the apparatus B within a specified period of time, the apparatus A transmits the TLP which has been stored in the retry buffer again (at a time T5). The TLP which is transmitted again at a time T5 is successfully received by the apparatus B at a time T6, and the apparatus B transmits an ACK DLLP response to the apparatus A. Thereafter, the apparatus A receives the ACK DLL response from the apparatus B at a time T7, and a data transmission process corresponding to the sequence number "10" is completed.

Related art is disclosed in Japanese Laid-open Patent Publication No. 2-285752.

Here, a link recovery process is performed when an error occurs in the serial communication line, and therefore, it is possible that a TLP transmitted from the link layer of the transmission apparatus is lost. In this case, data transmission is completed after the link layer of the transmission apparatus detects a time-out, and therefore, a period of time longer than a time-out period is needed for completion of the data transmission after the link recovery process. Hereinafter, the time-out of the link layer is denoted by "RTO".

The physical layer performs the link recovery process when an error occurs in the communication line. While the link recovery process is performed, the physical layer stops data transmission from the link layer. Here, since the link layer is independent from the physical layer, the link layer may transmit data to the physical layer before the physical layer performs the link recovery process. In this case, the data transmitted from the link layer is discarded in the physical layer while the physical layer is in the link recovery process.

As described above, if a timing when the link recovery process is performed in the physical layer competes against a timing when the data transmission is performed, data transmitted from the link layer may be lost. When the data transmitted from the link layer is lost, the data is transmitted again when the time-out detection of the link layer after a time-out period is elapsed.

FIG. 14 is a diagram illustrating a processing flow performed when a transmission TLP is lost. In the example illustrated in FIG. 14, the apparatus A transmits a TLP including a sequence number "10" added thereto to the physical layer at a time T1. At this time, at a time T2 immediately after the time T1, performance of the link recovery process is started on the communication line. In the link recovery process in the physical layer, the physical layers of the apparatuses A and B perform transmission/reception of a training sequence packet (TS packet) used to perform the link recovery process. The transmission/reception of the TS packet is performed by a physical layer packet (PLP) used to perform transmission between the physical layers.

In FIG. 14, the TLP transmitted from the link layer of the apparatus A is discarded in the physical layer since the physical layer is in the link recovery process. Therefore, a time-out (RTO) occurs in the link layer of the apparatus A (at a time T4). When the time-out (RTO) occurs, the link layer of the apparatus A recognizes that the TLP corresponding to the sequence number "10" has not been successfully transmitted and transmits data of the TLP which has been stored in the retry buffer again at a time T5. The TLP transmitted again is received by the apparatus B at a time T6, and an ACK DLLP response transmitted from the apparatus B is received by the apparatus A at a time T7 whereby a process of transmitting the TLP corresponding to the sequence number "10" is completed.

In the example illustrated in FIG. 14, the communication line is not allowed to be used in a period of time from the time T2 to the time T3 in which the physical layer has been performing the link recovery process, and therefore, retransmission of the TLP is suspended. However, in a period of time from the time T3 to the time T4 before the time-out is detected, the retransmission of the TLP does not have to be suspended. Accordingly, in this period of time, the time is unnecessarily wasted if the retransmission of the TLP is suspended.

FIG. 15 is a diagram illustrating a processing flow performed when a normal/abnormality notification (DLLP) is lost. In the example illustrated in FIG. 15, a TLP is transmitted from the apparatus B to the apparatus A at a time T1 and the apparatus A successfully receives the TLP at a time T2. Thereafter, the link layer of the apparatus A transmits an ACK DLLP to the apparatus B. However, at a time T3 immediately after the time T2, the physical layers start the link recovery process on the communication line, and therefore, the ACK DLLP transmitted by the link layer of the apparatus A is discarded by the physical layer of the apparatus A. In this case, the link layer of the apparatus B is not allowed to receive a response representing transmission confirmation from the apparatus A, and accordingly, a time-out (RTO) occurs at a time T5.

The apparatus B which detected the time-out at the time T5 determines that the TLP has not been successfully transmitted and transmits data of the TLP which has been stored in the retry buffer again. In this case, since the TLP corresponding to a sequence number "10" has been received by the apparatus A, the apparatus A discards the TLP received at a time T6 and transmits the ACK DLLP corresponding to the sequence number "10" to the apparatus B again.

Also in the example illustrated in FIG. 15, the communication line is not allowed to be used in a period of time from the time T3 to the time T4 in which the physical layer has been performing the link recovery process, and therefore, retransmission of the TLP is suspended. However, in a period of time from the time T4 to the time T5 before the time-out is detected, the retransmission of the TLP does not have to be suspended. Accordingly, in this period of time, the time is unnecessarily wasted if the retransmission of the TLP is suspended.

As described in the examples illustrated in FIGS. 14 and 15, in general, when data transmitted from the link layer is discarded while the physical layer is in the link recovery process, the link layer recognizes the lost transmitted data only by detecting a time-out (RTO). Specifically, there arises a problem in that, when the data transmitted from the link layer is lost, the data transmission is not completed until the time-out (RTO) time is reached in principle.

SUMMARY

A serial transmission apparatus, which transmits data through a serial communication line, includes a transmission unit configured to transmit data stored in a transmission data buffer to a transmission destination apparatus, a time-out detector configured to detect a time out when a response to the transmitted data from the transmission destination apparatus is not received within a specified period of time, a recovery state detector configured to detect a recovery state representing that the serial communication line is in a link recovery process, and a retransmission request unit configured to request the transmission unit to transmit again the data which has been stored in the transmission data buffer when the time-out detector detects the time-out or when the recovery state detector detects the recovery state of the serial communication line.

The object and advantages of the invention will be realized and attained at least by the elements, features, and combinations particularly pointed out in the claims.

It is to be understood that both the foregoing general description and the following detailed description are example and explanatory and are not restrictive of the invention, as claimed.

DESCRIPTION OF EMBODIMENTS

Figure 1:
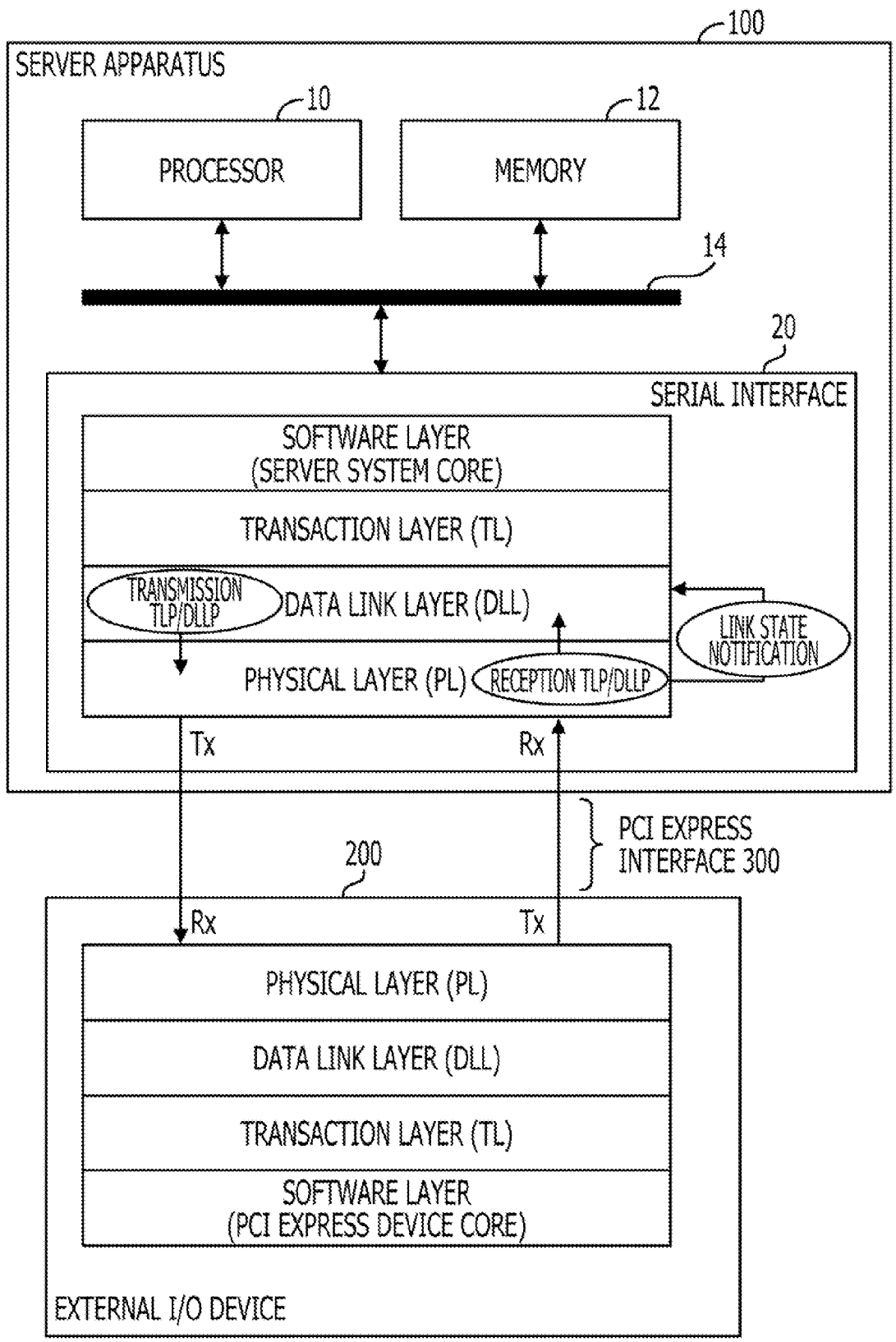
FIG. 1 is a diagram schematically illustrating a configuration of a server apparatus according to an embodiment.

FIG. 1 is a diagram illustrating a configuration of a server apparatus according to an embodiment. A server apparatus 100 illustrated in FIG. 1 includes a processor 10 and a memory 12. The server apparatus 100 further includes a serial interface 20 used to communicate with an external I/O device 200. The processor 10, the memory 12, and the serial interface 20 are connected to one another through a bus 14. In FIG. 1, descriptions of other elements included in the server apparatus 100 are omitted for convenience.

In the example of the configuration of the server apparatus illustrated in FIG. 1, the server apparatus 100 and the external I/O device 200 communicate with each other using a PCI Express interface. Each of the serial interface 20 and the external I/O device 200 has three layers (TL, DLL, and PL) which include the PCI Express interface and a software layer located on a higher level of the three layers. The software layer included in the serial interface 20 functions as a layer which controls a server system of the server apparatus 100

(Server System core). The software layer in the external I/O device 200 functions as device driver software which controls data transmission/reception through a PCI Express interface 300 (PCI Express Device core).

Each of the transaction layers (TL) has a function of transmitting/receiving data in accordance with a PCI Express protocol relative to a corresponding one of the software layers located in the higher level, and generates a transaction layer packet (TLP) used for transmission/reception of data relative to a counterpart apparatus.

Each of the data link layers (DLL) performs control for ensuring data transmission with the counterpart apparatus. Each of the physical layers (PL) controls establishment of connection with the counterpart apparatus using a communication line (link), transmits/receives data through the communication line, and performs link recovery process when an error occurs in the communication line. The data link layers (DLL) and the physical layers (PL) will be described in detail hereinafter with reference to FIG. 2.

Figure 2:
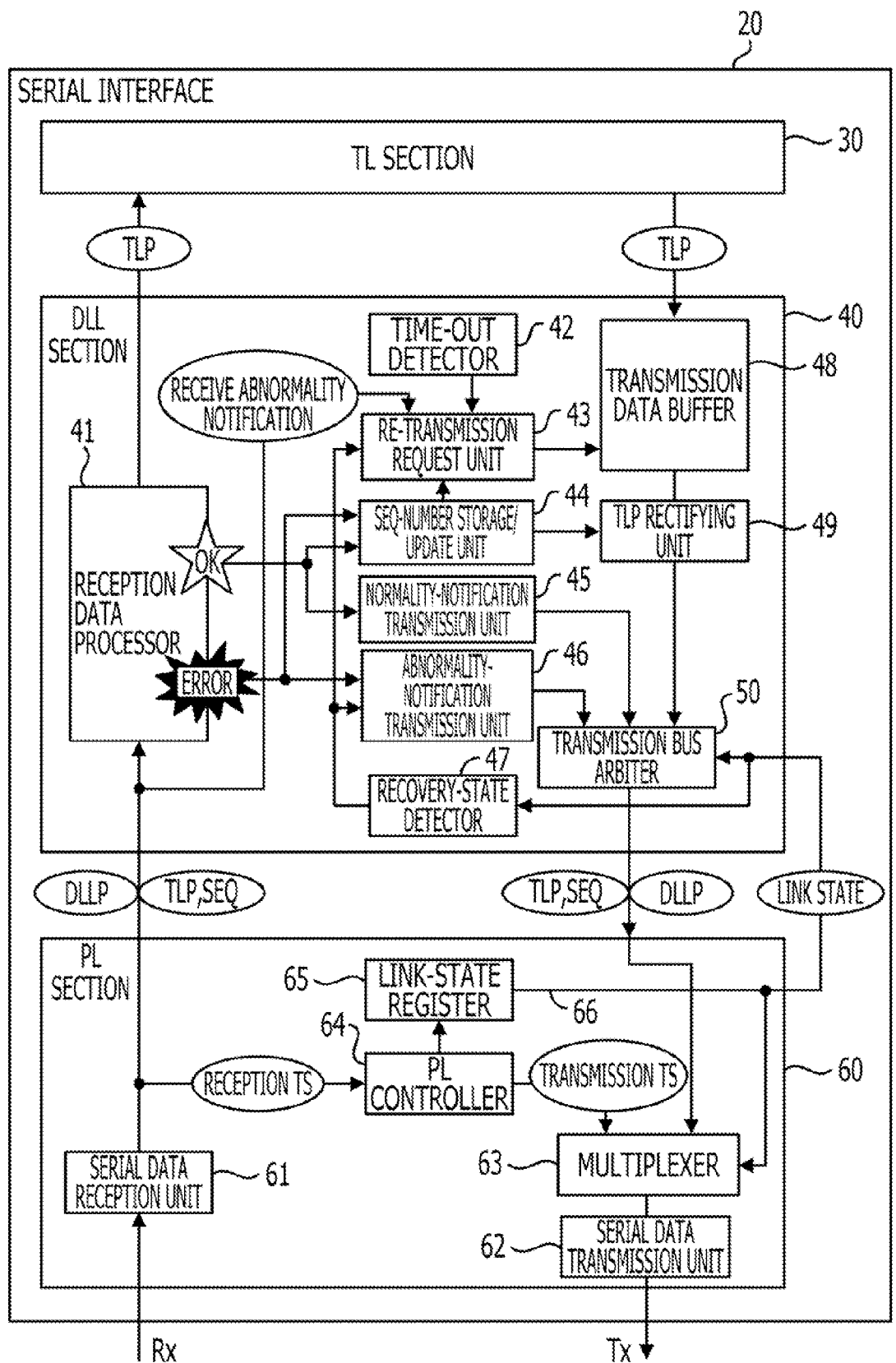
FIG. 2 is a block diagram illustrating a data link layer and a physical layer of a serial transmission apparatus according to the embodiment.

FIG. 2 is a block diagram illustrating the data link layer and the physical layer of the serial interface 20 of this embodiment. FIG. 2 is a diagram particularly explaining the data link layer (DLL section) 40 and the physical layer (PL section) 60 according to the embodiment among components included in the serial interface 20.

The DLL section 40 functioning as the data link layer (DLL) performs a process of rectifying TLP transmitted from a transaction layer (TL section) 30. Specifically, the DLL section 40 adds a sequence number (SEQ) and CRC information to a TLP transmitted from the TL section 30 before supplying the TLP to the PL section 60 and performs a TLP retransmission process when the TLP transmission is not successfully terminated and the like processes. Furthermore, the DLL section 40 performs a process of checking a result of a reception in accordance with a sequence number, CRC information included in a received TLP supplied from a counterpart apparatus, and the like, and performs a process of returning a result of the checking to the counterpart apparatus using the data link layer packet (DLLP).

The DLL section 40 selects data (a packet) to be transmitted and transfers the data to the physical layer (PL section 60). At this time, the DLL section 40 controls the transmission of the data to the PL section 60 in accordance with a state (link state) of the communication line. When once starting the data transmission, the DLL section 40 continues the data transmission until the transmission of the packet data is completed.

Furthermore, the DLL section 40 detects a recovery state of the communication line, that is, detects a state in which the PL section 60 performs the link recovery process on the communication line. When detecting the recovery state while TLP data or DLLP data is transmitted, the DLL section 40 determines that the TLP data or the DLLP data which is being transmitted is lost in the communication line between the apparatuses and reserves retransmission of the TLP or the DLLP. Thereafter, when recognizing that the communication line is recovered from in the recovery state, that is, the communication line is recovered from a state in which the link recovery process is performed through a "LINK state" signal representing the link state of the communication line supplied from the PL section 60, the DLL section 40 transmits the TLP or the DLLP again to the PL section 60.

Since a mechanism in which the DLL section 40 detects the recovery state of the communication line and the TLP or the DLLP is transmitted again is provided, the DLL section 40 may recognize a retransmission of the TLP or the DLLP. As a result, the data transmission may be completed without waiting for detection of a time-out after the PL section 60 performs the link recovery process. Furthermore, an unnecessary time-out may be prevented from being detected. Hereinafter, components included in the DLL section 40 illustrated in FIG. 2 will be described in detail.

When functioning as a data link layer of a data reception side, a reception data processor 41 generates TLP data to be output to the TL section 30 in accordance with TLP data received through the PL section 60. Here, it is determined whether the data has been successfully received in accordance with CRC information included in the received TLP. When the TLP data has been successfully received, the reception data processor 41 instructs a normality-notification transmission unit 45 to transmit an ACK DLLP response and instructs a SEQ-number storage/update unit 44 to update a reception SEQ number of a TLP to be received next.

On the other hand, when the TLP data has not been successfully received due to a CRC error or the like, the reception data processor 41 instructs an abnormality-notification transmission unit 46 to transmit a NAK DLLP response. In addition, the reception data processor 41 instructs the SEQ-number storage/update unit 44 not to update the reception SEQ number. In this case, the reception data processor 41 may not instruct anything to the SEQ-number storage/update unit 44 so that the reception SEQ number is prevented from being updated.

When functioning as a data link layer on a data transmission side, the reception data processor 41 determines whether a TLP has been successfully transmitted to a transmission destination apparatus in accordance with a DLLP received through the PL section 60. When receiving an ACK DLLP, the reception data processor 41 instructs the SEQ-number storage/update unit 44 to update a transmission SEQ number. Furthermore, since the TLP data which corresponds to the received ACK DLLP and which has been transmitted is no longer used, the reception data processor 41 instructs a transmission data buffer 48 to discard the TLP data which is no longer used (not illustrated).

On the other hand, when the reception data processor 41 receives a NAK DLLP, since the transmission TLP has not been successfully received by the transmission destination apparatus, an instruction for retransmission of the TLP is input to a retransmission request unit 43 in response to the NAK DLLP. The instruction for retransmission of the TLP supplied to the retransmission request unit 43 may be performed by directly decoding the received DLLP in a certain circuit (not illustrated) as illustrated in FIG. 2, or may be performed by performing a similar process in the reception data processor 41. When the reception data processor 41 receives the NAK DLLP, update of a reception SEQ number and discard of the TLP data which has been transmitted are not performed.

A time-out detector 42 detects a time-out when a DLLP response relative to a transmitted TLP is not returned from a transmission destination apparatus within a specified period of time. Specifically, the time-out detector 42 has a timer counter or the like which counts a period of time from when the TLP is transmitted to when the DLLP response corresponding to the transmitted TLP is returned from the transmission destination apparatus. The timer counter included in the time-out detector 42 starts counting in response to transmission of the TLP and stops or resets the counter in response to reception of the DLLP.

A recovery-state detector 47 determines whether the communication line is in a recovery state, that is, whether the link recovery process has been performed on the communication line in accordance with a "Link state" signal which is information representing that the PL section 60 links with the communication line. When the recovery state of the communication line is detected, the recovery-state detector 47 notifies the retransmission request unit 43 and the abnormality-notification transmission unit 46 which will be described hereinafter of the recovery state of the communication line.

The retransmission request unit 43 instructs, when a TLP-data retransmission request is issued, the transmission data buffer 48 to transmit a TLP which has been transmitted and which has been stored in the transmission data buffer 48 to the transmission destination apparatus again. The TLP-data retransmission request is issued when the time-out detector 42 detects a time-out, for example. Furthermore, the TLP-data retransmission request is issued when a NAK DLLP response is received, that is, when the transmission destination apparatus does not successfully receive a TLP, for example. Furthermore, the TLP retransmission request is issued also when the recovery-state detector 47 detects the recovery state of the communication line since it is possible that TLP transmission data is lost during the link recovery process performed on the communication line. The retransmission request unit 43 will be described in detail hereinafter with reference to FIG. 3.

The SEQ-number storage/update unit 44 stores a transmission sequence number to be added to a transmission TLP and a reception sequence number to be added to a DLLP and updates a stored sequence number.

The normality-notification transmission unit 45 generates, when the reception data processor 41 successfully received a TLP supplied from the transmission source apparatus, an ACK DLLP and transmits the ACK DLLP to the transmission source apparatus. The abnormality-notification transmission unit 46 generates, when the reception data processor 41 does not successfully receive a TLP supplied from the transmission source apparatus, a NAK DLLP and transmits the NAK DLLP to the transmission source apparatus. When the recovery-state detector 47 detects the recovery state of the communication line, it is possible that ACK/NAK DLLP data is lost during the link recovery process performed on the communication line. Accordingly, the recovery-state detector 47 causes the abnormality-notification transmission unit 46 to transmit the NAK DLLP again. The normality-notification transmission unit 45 and the abnormality-notification transmission unit 46 will be described in detail hereinafter with reference to FIG. 4.

The transmission data buffer 48 stores a transmission TLP supplied from the TL section 30 and functions as a retry buffer after transmission of the TLP. When a retransmission request is issued from the retransmission request unit 43, the transmission data buffer 48 transmits again a stored TLP which has been transmitted. When the reception data processor 41 receives an ACK DLLP which corresponds to a transmitted TLP and which is supplied from the transmission source apparatus, TLP data corresponding to a sequence number before a sequence number notified by the ACK DLLP is discarded from the transmission data buffer 48. The discard of the TLP data means release of a buffer region which stored the discarded TLP data. Accordingly, as a control method, when a valid signal corresponding to the buffer region is issued, control is performed such that the valid signal is disabled. Furthermore, the buffer region may be simply used as a rewritable region, and a process of discarding unnecessary TLP data may be performed by another appropriate process.

A TLP rectifying unit 49 adds a transmission sequence number which is stored in the SEQ-number storage/update unit 44 to a TLP transmitted from the transmission data buffer 48. Then, the TLP rectifying unit 49 generates CRC information used for data check and adds the CRC information to a transmission TLP to which a transmission sequence number is added.

A transmission bus arbiter 50 adjusts a request for transmitting a TLP supplied from the TLP rectifying unit 49, a request for transmitting an ACK DLLP supplied from the normality-notification transmission unit 45, and a request for transmitting a NAK DLLP supplied from the abnormality-notification transmission unit 46 and transmits the requests to the PL section 60. Here, when a state (link state) of the communication line which is to be transmitted from the PL section 60 is transmittable, the transmission bus arbiter 50 starts packet transmission. When a signal representing the link state transmitted from the PL section 60 is not transmittable, transmission of data is suspended until the communication line enters a transmission available state. For example, when the communication line is in the recovery state, data is not transmitted, and therefore, the transmission bus arbiter 50 suspends data transmission until the communication line is recovered.

The PL section 60 converts a transmission TLP/DLLP supplied from the data link layer into a serial signal and transmits the transmission TLP/DLLP to the serial communication line. Furthermore, the PL section 60 converts a serial signal received through the communication line into a parallel signal and supplies the parallel signal as a reception TLP/DLLP to the data link layer. The PL section 60 monitors a state of the communication line and notifies the data link layer of the state of the communication line as information representing the "LINK state" through a signal line 66.

In FIG. 2, a communication line on the transmission side is denoted by "Tx" and a communication line on the reception side is denoted by "Rx". Each of the communication lines Tx and Rx includes a pair of differential signals which are generated in the PL section 60. Transmission and reception of a serial signal is performed through the differential signals of the communication lines Tx and Rx.

The PL section 60 includes a serial data reception unit 61, a serial data transmission unit 62, a multiplexer 63, a PL controller 64, and a LINK-state register 65.

The serial data reception unit 61 converts serial data received through the line Rx into parallel data and determines whether the received data is one of a TLP and a DLLP. When the received data is a TLP or a DLLP, the serial data reception unit 61 transfers the received data which has been converted into parallel data to the DLL section 40.

When the received data is a training sequence packet (TS packet), the serial data reception unit 61 does not transfer the received TS packet (reception TS) to the DLL section 40 but transfers the received TS packet to the PL controller 64. Here, the TS packet means a packet to be transmitted for LINK establishment generated by the physical layer itself. The TS packet is transmitted in a case where the communication line is controlled when the apparatus is initialized or when the link recovery process, for example, is performed in the recovery state of the communication line. The PL controller 64 which has received the TS packet generates a transmission TS packet (transmission TS) and transmits the transmission TS packet to the counterpart apparatus through the multiplexer 63.

The serial data transmission unit 62 performs parallel-serial conversion on TLP/DLLP data or transmission TS packet data which is selected by the multiplexer 63 and transmits the data to the transmission destination apparatus through the line Tx.

The multiplexer 63 selects transmission of a TLP or a DLLP or transmission of a TS packet in accordance with the LINK state. When the LINK state represents a normal state in which the data transmission/reception is available, the multiplexer 63 selects and outputs a TLP or a DLLP. When transmission/reception of serial data is not allowed to be performed through the communication line, that is, the LINK state is not stable, the multiplexer 63 selects and outputs a TS packet. When the multiplexer 63 selects a TS packet, a transmission TLP or a transmission DLLP transferred from the DLL section 40 is discarded in the PL section 60.

The PL controller 64 performs management of a control state of the physical layer and controls connection of the serial communication line. Examples of a condition in which the control state of the physical layer becomes the recovery state described above include a case where a time-out occurs several times in TLP transmission, a case where a TS packet is received from the counterpart apparatus, and a case where the processor 10 directly performs control.

The LINK-state register 65 displays the LINK state of the communication line and the link state is set by the PL controller 64. The LINK-state register 65 includes a four-bit register, for example, and information stored in the LINK-state register 65 is accessible from the processor 10 through a specified bus (not illustrated). A value stored in the LINK-state register 65 is transmitted to the DLL section 40 through the control signal line 66 illustrated in FIG. 2.

Figure 3:
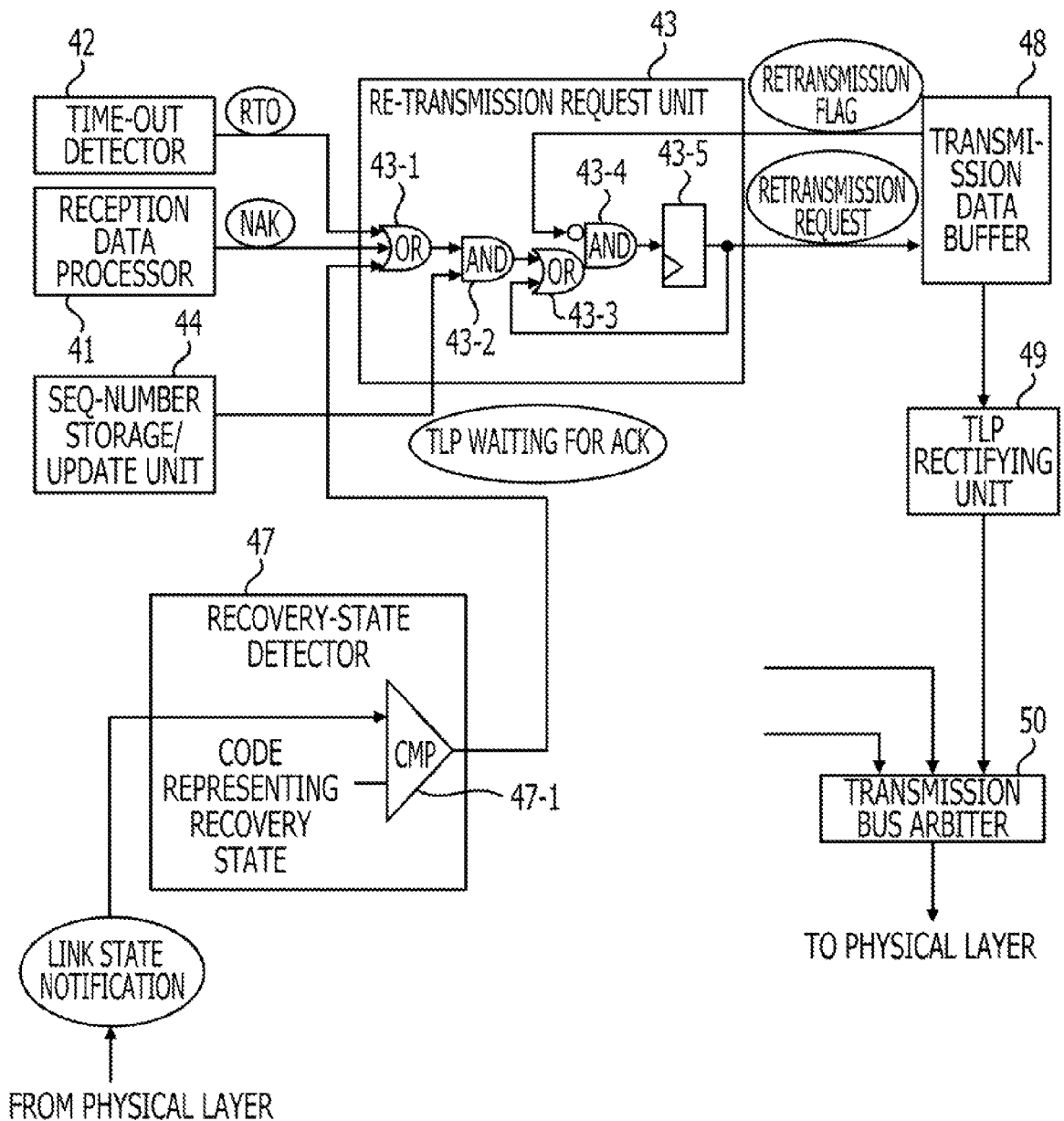
FIG. 3 is a diagram illustrating a circuit associated with a TLP retransmission process according to the embodiment.

FIG. 3 is a diagram illustrating a circuit associated with a TLP retransmission process performed by the DLL section 40 according to the embodiment. Processing blocks illustrated in FIG. 3 which are substantially the same as those illustrated in FIG. 2 are denoted by reference numbers the same as those illustrated in FIG. 2. Furthermore, descriptions of circuits which are not associated with the TLP retransmission process are eliminated.

The recovery-state detector 47 determines whether the communication line is in the recovery state in accordance with a LINK-state notification signal supplied from the PL section 60 which performs a process of the physical layer. Specifically, the recovery-state detector 47 compares the LINK state notification signal supplied from the PL section 60 with a code value representing the recovery state using a comparator 47-1. When detecting the LINK state, the comparator 47-1 outputs "1" in this embodiment.

The time-out detector 42 outputs, when detecting a time-out, "1" as a time-out signal (RTO) in this embodiment. Furthermore, the reception data processor 41 outputs, when receiving a NAK DLLP, "1" as an abnormality notification signal (NAK) in this embodiment.

The retransmission request unit 43 transmits a TLP which has been stored in the transmission data buffer 48 again when a time-out occurs, when an abnormality notification (NAK DLLP) is received from the counterpart apparatus, or when the recovery state is detected.

An OR gate 43-1 of the retransmission request unit 43 receives a time-out signal output by the time-out detector 42, an abnormality notification signal (NAK) output by the reception data processor 41, and a recovery-state detection result signal output by the recovery-state detector 47 and outputs "1" when one of the input signals represents "1".

When the OR gate 43-1 outputs "1" and a signal which is transmitted from the SEQ-number storage/update unit 44 and which represents whether transmission of a normality notification (ACK) corresponding to a transmitted TLP has been suspended is "1", an AND gate 43-2 outputs "1". At this time, when an FF 43-5 which generates a TLP retransmission request signal outputs "0" representing that a TLP retransmission request is not issued, one of inputs of an OR gate 43-3 remains to be "0". Accordingly, when the AND gate 43-2 outputs "1", the OR gate 43-3 also outputs "1".

At this time, in a case where a value of a retransmission Flag signal which will be described hereinafter and which is input in an inverted state to one of terminals of an AND gate 43-4 is "0", when the OR gate 43-3 outputs "1", the AND gate 43-4 also outputs "1". As a result, an output of the FF 43-5 is set to "1" in the next clock cycle. When the output of the FF 43-5 is set to 1, a TLP retransmission request signal to be transmitted to the transmission data buffer 48 is set to "1".

The transmission data buffer 48 transmits, when receiving 1 as the TLP retransmission request signal, a TLP to the TLP rectifying unit 49 again. When starting execution of the TLP retransmission process, the transmission data buffer 48 sets "1" to the retransmission Flag signal representing that the TLP retransmission process is in operation. When completing the process of transmitting a TLP again to the TLP rectifying unit 49, the transmission data buffer 48 returns the retransmission Flag signal to "0". The transmission data buffer 48 notifies the re-transmission request unit 43 of the retransmission Flag signal. When the retransmission Flag signal supplied from the transmission data buffer 48 is set to 1, the AND gate 43-4 outputs 0, and furthermore, the FF 43-5 outputs 0 using the next clock edge as a trigger.

The TLP rectifying unit 49 adds a transmission sequence number to a TLP output from the transmission data buffer 48. The TLP to which the transmission sequence number is added is supplied to the transmission bus arbiter 50 and further transmitted to the physical layer.

Figure 4:
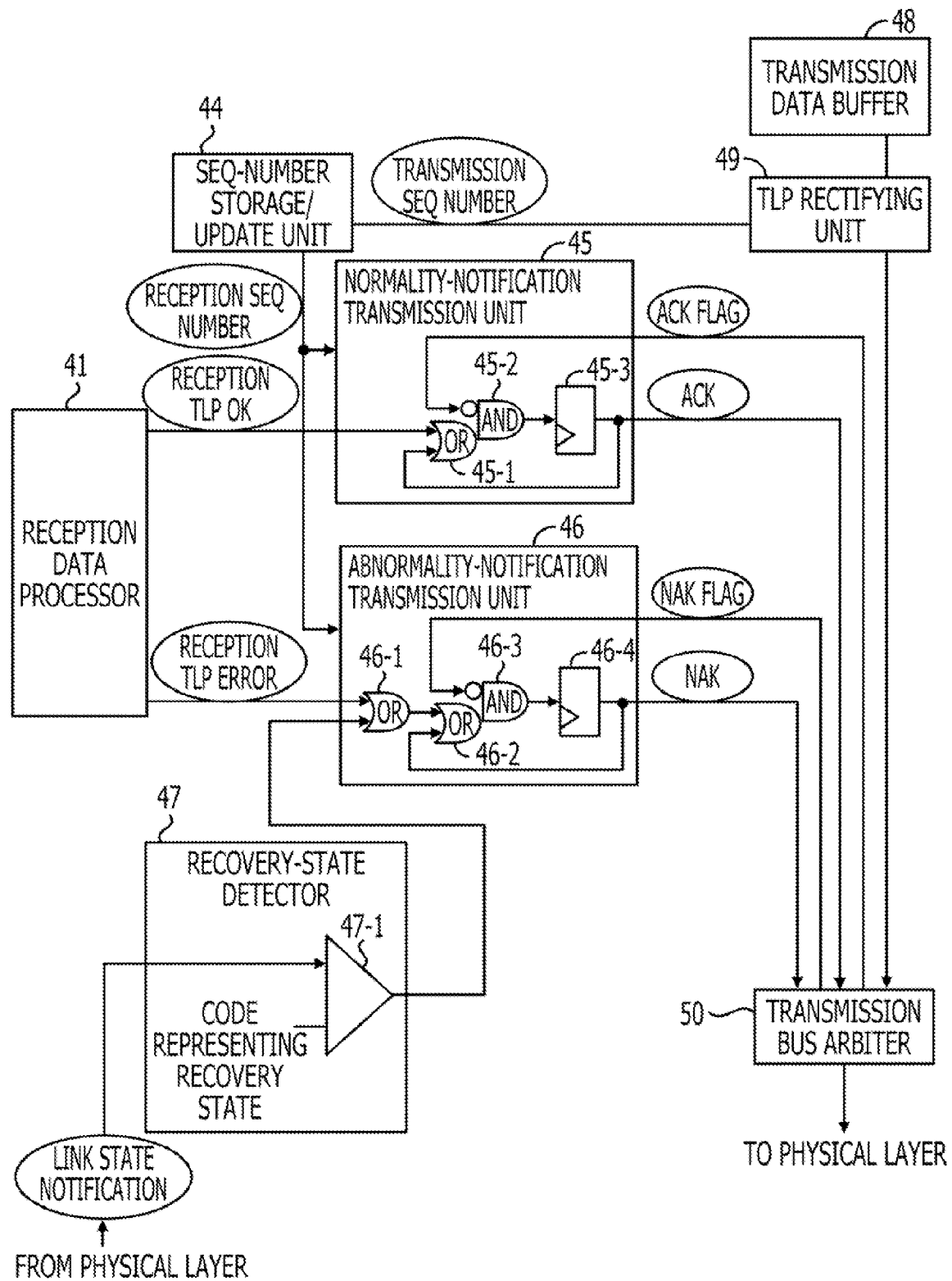
FIG. 4 is a diagram illustrating a circuit associated with a DLLP retransmission process according to the embodiment.

FIG. 4 is a diagram illustrating a circuit associated with a DLLP retransmission process performed by the DLL section 40 according to the embodiment. Processing blocks illustrated in FIG. 4 which are substantially the same as those illustrated in FIG. 2 are denoted by reference numbers the same as those illustrated in FIG. 2. Furthermore, descriptions of circuits which are not associated with the DLLP retransmission process are omitted.

In FIG. 4, when a result of checking of a reception TLP performed by the reception data processor 41 is normal (OK), the normality-notification transmission unit 45 transmits an ACK DLLP (ACK) to a TLP transmission source.

Specifically, when a signal which is supplied from the reception data processor 41 and which represents a result of TLP transmission is set to 1 which is a value representing normal (OK), 1 is input to one of input terminals of an OR gate 45-1. At this time, when an FF 45-3 which controls ACK DLLP transmission outputs "0" representing that an ACK transmission request is not issued, a value of the other of the inputs of the OR gate 45-1 remains to be "0". Accordingly, when the signal representing the result of the TLP reception is set to "1", a value of an output terminal of the OR gate 45-1 is "1".

At this time, in a case where a value of an ACK Flag signal which is input in an inverted state to one of terminals of an AND gate 45-2 is "0", when the OR gate 45-1 outputs "1", the AND gate 45-2 also outputs "1". As a result, an output of the FF 45-3 is set to "1" in the next clock cycle.

When the FF 45-3 outputs "1", the normality-notification transmission unit 45 generates an ACK DLLP (ACK) having a reception SEQ number supplied from the SEQ-number storage/update unit 44 and transmits the ACK DLLP to the transmission bus arbiter 50. When receiving the ACK DLLP, the transmission bus arbiter 50 sets an ACK Flag representing that a request for transmitting the ACK DLLP has been issued to "1". Then, after actually transmitting the ACK DLLP to the physical layer, the transmission bus arbiter 50 returns the ACK Flag to "0". After the ACK Flag is set to "1", while the transmission bus arbiter 50 is forced to wait for transmission of an ACK DLLP to the physical layer for some reason, the ACK Flag remains to be "1".

When the ACK Flag becomes "1" after being transmitted from the transmission bus arbiter 50 to the normality-notification transmission unit 45, an output of the AND gate 45-2 becomes "0" and an output of the FF 45-3 returns to "0". While the ACK Flag is "1", the output of the AND gate 45-2 remains to be "0". After the ACK Flag becomes "0", the next input from the reception data processor 41 is accepted.

Next, operation of the abnormality-notification transmission unit 46 will be described. When a result of checking of a reception TLP performed by the reception data processor 41 is abnormal (error) or when the recovery-state detector 47 detects the recovery state, the abnormality-notification transmission unit 46 transmits an NAK DLLP to the TLP transmission source.

Specifically, a signal representing the recovery state supplied from the recovery-state detector 47 or a signal which corresponds to a value 1 when a result of reception of a TLP supplied from the reception data processor 41 is abnormal becomes "1", an OR gate 46-1 of the abnormality-notification transmission unit 46 outputs a value "1". At this time, when an FF 46-4 which controls NAK DLLP transmission outputs "0" representing that an NAK transmission request has not been issued, one of input terminals of an OR gate 46-2 remains to be "0". Therefore, when the OR gate 46-1 outputs "1", the OR gate 46-2 also outputs "1".

At this time, in a case where an NAK Flag signal which is input in an inverted state to one of terminals of an AND gate 46-3 is "0", when the OR gate 46-2 outputs "1", the AND gate 46-3 also outputs "1". As a result, an output of the FF 46-4 is set to "1" in the next clock cycle.

When the FF 46-4 outputs "1", the abnormality-notification transmission unit 46 generates an NAK DLLP (NAK) having a reception SEQ number supplied from the SEQ-number storage/update unit 44 and transmits the NAK DLLP to the transmission bus arbiter 50. When receiving the NAK DLLP, the transmission bus arbiter 50 sets an NAK Flag representing that a request for transmitting the NAK DLLP has been issued to "1". Then, after actually transmitting the NAK DLLP to the physical layer, the transmission bus arbiter 50 returns the NAK Flag to "0". After the NAK Flag is set to "1", the NAK Flag remains to be "1" until the transmission bus arbiter 50 actually transmits the NAK DLLP.

When the NAK Flag becomes "1" after being transmitted from the transmission bus arbiter 50 to the abnormality-notification transmission unit 46, an output of the AND gate 46-3 becomes "0" and an output of the FF 46-4 returns to "0". While the NAK Flag is "1", the output of the AND gate 46-3 remains to be "0". After the NAK Flag becomes "0", the next input from the reception data processor 41 or the recovery-state detector 47 is accepted.

Figure 5:
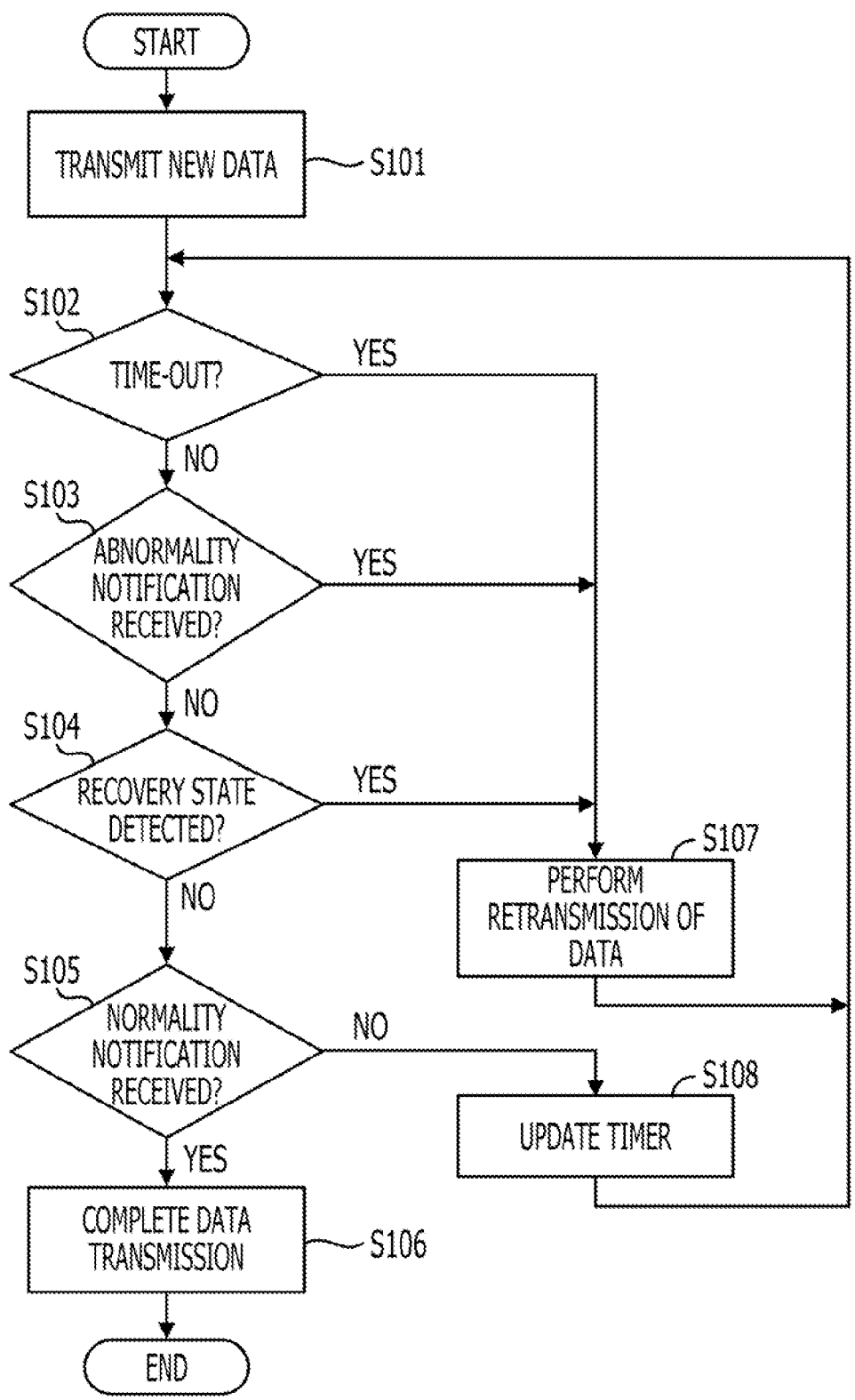
FIG. 5 is a flowchart illustrating a control flow of data transmission.

FIG. 5 is a flowchart illustrating a control flow of a data transmission mechanism of the data link layer. Transmission of data (TLP) is finally completed when a normality notification, that is, an ACK DLLP is supplied from the transmission destination apparatus. In a case where it is assumed that the transmission destination apparatus has not successfully received a transmission TLP after the TLP is transmitted, the TLP which has been transmitted is transmitted again. A determination as to whether the retransmission of the TLP is to be performed is made by a determination as to whether a time-out occurs after the TLP is transmitted, a determination as to whether an abnormality notification (NAK DLLP) is received after the TLP is transmitted, or a determination as to whether the recovery state is detected after the TLP is transmitted.

In FIG. 5, when newly receiving transmission data (TLP) supplied from the TL section 30, the DLL section 40 adds a transmission sequence number to the TLP and transmits the TLP to the transmission destination apparatus (in operation S101). Specifically, the TLP transmitted from the TL section 30 is first stored in the transmission data buffer 48. Thereafter, the TLP rectifying unit 49 adds a transmission sequence number to the TLP, and the TLP is supplied through the transmission bus arbiter 50 to the PL section 60 and further transmitted to the serial communication line.

After the TLP is transmitted, the TLP which has been transmitted is stored in the transmission data buffer 48 until a normality notification (ACK DLLP) is supplied from the transmission destination apparatus. Furthermore, in addition, the time-out detector 42 included in the DLL section 40 determines whether the ACK DLLP is returned from the transmission destination apparatus within a specified period of time in accordance with counting performed by the timer. Thereafter, the following series of processes is repeatedly performed until the ACK DLLP is returned from the transmission destination apparatus.

After the TLP is transmitted in operation S101, it is first determined whether the time-out detector 42 detects a time-out (in operation S102). When the time-out does not occur (the determination is negative in operation S102), it is determined whether an abnormality notification (NAK DLLP) is received (in operation S103). When the abnormality notification (NAK DLLP) is not received (the determination is negative in operation S103), it is determined whether the recovery-state detector 47 detects the recovery state of the communication line (in operation S104). When the recovery state is not detected (the determination is negative in operation S104), it is determined whether a normality notification (ACK DLLP) is supplied from the transmission destination apparatus (in operation S105).

When it is determined that the normality notification is not supplied from the transmission destination apparatus (the determination is negative in operation S105), the timer of the time-out detector 42 is updated (in operation S108). Here, if the timer of the time-out detector 42 is configured to be automatically updated, the timer updating process in operation S108 is skipped and the process returns to the determination in operation S102. As described above, basically, after the TLP is transmitted in operation S101, the process from operation S102 to operation S105 is performed until the normality notification is received within a specified period of time.

While the process from operation S102 to operation S105 is performed, when the time-out is detected (the determination is affirmative in operation S102), when the abnormality notification is received (the determination is affirmative in operation S103), or when the recovery state is detected (the determination is affirmative in operation S104), it is determined that the TLP is not successfully transmitted. Accordingly, in operation S107, the re-transmission request unit 43 transmits a retransmission request to the transmission data buffer 48 and the transmitted TLP which has been stored in the transmission data buffer 48 is transmitted again to the transmission destination apparatus. Note that when the communication line is in a state of the link recovery process when the TLP is transmitted again in operation S107, the transmission of the TLP is suspended. Then, after the communication line is recovered, the TLP is transmitted again and the process in operation S107 is completed. After the TLP is transmitted again in operation S107, the timer of the time-out detector 42 is reset and the process in operation S102 to operation S105 is performed again.

If the time-out is consecutively detected several times (the determination is affirmative in operation S102) and the data retransmission is performed (in operation S107), it is possible that the communication line is not operating normally. Therefore, the PL section 60 preferably performs the link recovery process (not illustrated). Furthermore, also in a case where the PL section 60 uniquely detects an error of the communication line or the like, the PL section 60 performs the link recovery process on the communication line. While the link recovery process is performed on the communication line, the recovery-state detector 47 detects the recovery state in operation S104 (the determination is affirmative in operation S104). A result of the detection performed by the recovery-state detector 47 is transmitted to the re-transmission request unit 43, and the TLP data is transmitted again by a process similar to that described above (in operation S107). Then, when a normality notification corresponding to the TLP transmitted again is supplied from the transmission destination apparatus, it is determined that the transmission of the TLP data is completed.

When it is determined that the normality notification (ACK DLLP) is supplied from the transmission destination apparatus in operation S105 (the determination is affirmative in operation S105), it is determined that the transmission TLP is successfully received by the transmission destination apparatus (in operation S106). Accordingly, since the transmitted TLP data which has been stored in the transmission data buffer 48 is no longer used, TLP data having a sequence numbers before the sequence number included in the ACK DLLP is discarded from the transmission data buffer 48, and the TLP transmission process is completed.

Note that, in the flowchart illustrated in FIG. 5, the processes in operation S102, operation S103, and operation S104 may be performed in an arbitrary order. Furthermore, the processes from operation S102 to operation S105 may be successively performed every operation clock cycle time in the DLL section 40 or may be performed using a clock which is the integral multiple of a data transfer clock of the serial communication line.

As described above, since the recovery-state detection determination process is performed while the reception of the normality notification is waited after the TLP is transmitted, even when the communication line is in the recovery state, the transmission of the TLP can be completed without waiting for the time-out.

Figure 6:
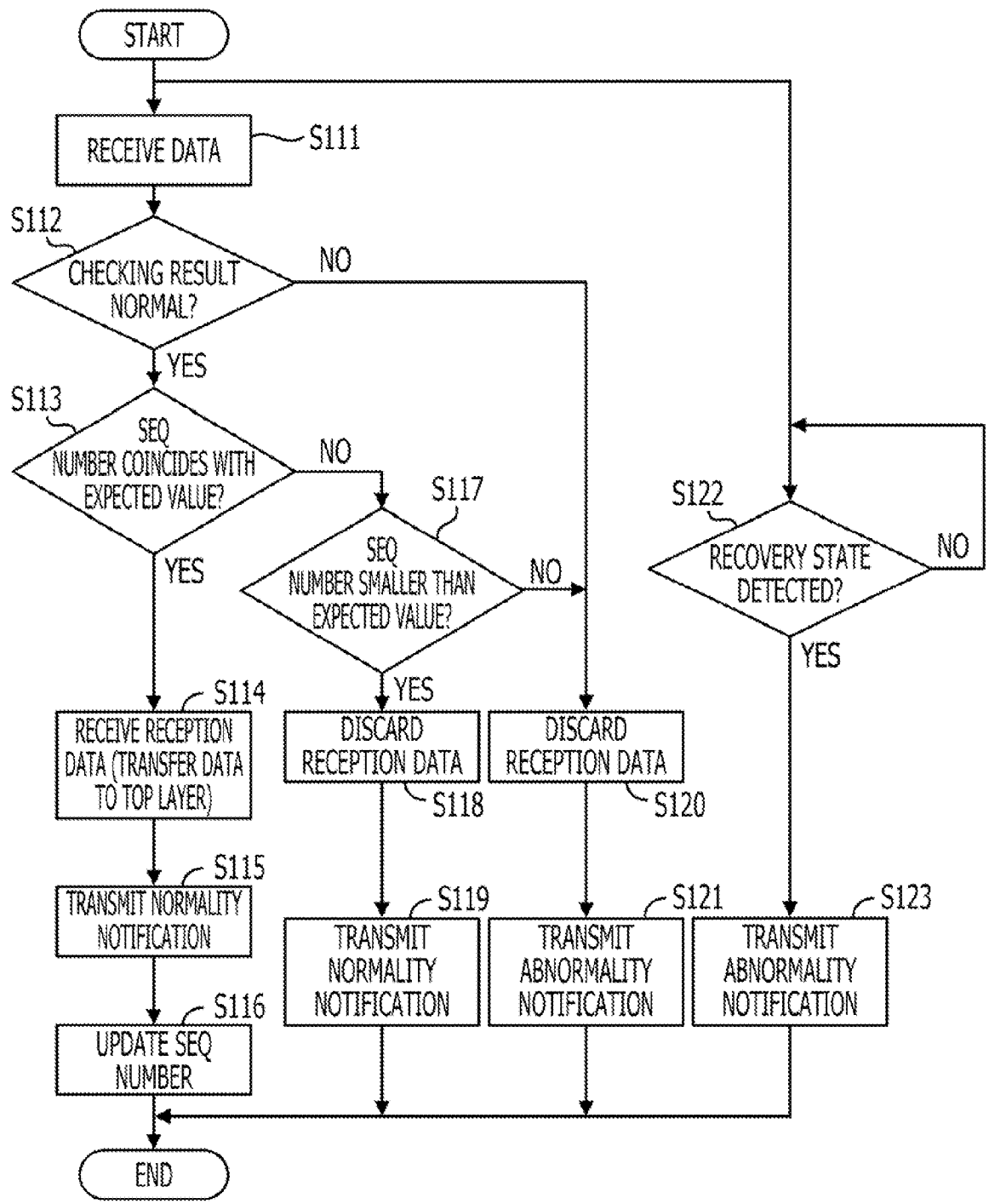
FIG. 6 is a flowchart illustrating another control flow of data transmission.

FIG. 6 is a flowchart illustrating a control flow of a data reception mechanism of the data link layer. When TLP data is received, it is determined whether the TLP is successfully received by performing CRC checking in accordance with CRC information included in the received TLP and by checking a sequence number of the received TLP. Then, in accordance with a result of the determination as to whether the TLP is successfully received, a normal/abnormality notification (ACK/NAK DLLP) is returned to a TLP transmission source and received TLP data is accepted or subjected to a discarding process. Hereinafter, a description will be made with reference to the flowchart illustrated in FIG. 6.

When receiving TLP data supplied from the transmission source apparatus through the PL section 60 (in operation S111), the reception data processor 41 of the DLL section 40 determines whether the TLP has been successfully received in accordance with CRC information included in the received data (in operation S112).

As a result of the determination in operation S112, when it is determined that the TLP has not been successfully received due to detection of a CRC error (the determination is negative in operation S112), the received TLP data is discarded (in operation S120). Then, the reception data processor 41 notifies the abnormality-notification transmission unit 46 of the result representing that the determination result represents abnormality (error). The abnormality-notification transmission unit 46 which received information on the error transmits an abnormality notification (NAK DLLP) to the TLP transmission source (in operation S121).

When a result of the determination represents normal (the determination is affirmative in operation S112), it is determined whether a sequence number included in the received TLP coincides with an expected sequence number (in operation S113).

When the sequence number included in the received TLP does not coincide with the expected sequence number (the determination is negative in operation S113), the sequence number of the received TLP and the expected sequence number are compared with each other (in operation S117). When the sequence number of the received TLP is smaller than the expected value (the determination is affirmative in operation S117), the received TLP overlaps one of TLPs which have been previously received. Accordingly, the reception data processor 41 discards the received TLP (in operation S118) and instructs the normality-notification transmission unit 45 to return a normality notification (ACK DLLP) to the TLP transmission source. The normality-notification transmission unit 45 which received the instruction transmits the normality notification to the TLP transmission source (in operation S119), and the process of receiving the TLP is terminated.

When the sequence number of the received TLP is larger than the expected value (the determination is negative in operation S117), a TLP corresponding to the expected sequence number has not been successfully received and the TLP is to be transmitted again. Accordingly, the reception data processor 41 discards the received TLP (in operation S120) and instructs the abnormality-notification transmission unit 46 to return an abnormality notification (NAK DLLP). The abnormality-notification transmission unit 46 which received the instruction adds a sequence number of the latest TLP which has been successfully received to the abnormality notification to be transmitted to the TLP transmission source (in operation S121).

When the sequence number included in the received TLP coincides with the value of the expected sequence number (the determination is affirmative in operation S113), it is determined that the TLP has been successfully received. Therefore, the received TLP is transmitted to the TL section 30 (in operation S114). Thereafter, the reception data processor 41 instructs the normality-notification transmission unit 45 to transmit a normality notification (ACK DLLP) and the normality-notification transmission unit 45 successfully transmits the normality notification to the TLP transmission source (in operation S115). Furthermore, the reception data processor 41 instructs the SEQ-number storage/update unit 44 to perform a process of updating the received SEQ number (in operation S116) and the TLP reception process is terminated.

Here, when the link recovery process is performed in the PL section 60 substantially simultaneously with the TLP data reception, it is possible that a normal/abnormality notification (ACK/NAK DLLP) transmitted to the transmission source apparatus is lost as described above. Even in this case, a time-out does not occur in this embodiment and the recovery-state detector 47 monitors the LINK state from the PL section 60 to complete data transmission/reception after recovering from the recovery state. In the flowchart illustrated in FIG. 6, immediately after the start, detection of the recovery state of the communication line is performed in operation S122 in parallel to the data reception process performed in operation S111 onward. When the recovery state is not detected (the determination is negative in operation S122), the condition determination in operation S122 is repeatedly performed.

The recovery-state detector 47 instructs the abnormality-notification transmission unit 46 to transmit an abnormality notification (NAK DLLP) independently from the TLP data reception control when the recovery state of the communication line is detected (the determination is affirmative in operation S122). The abnormality-notification transmission unit 46 which received the instruction from the recovery-state detector 47 transmits the abnormality notification to which a sequence number of the latest TLP which has been successfully received is added to the counterpart apparatus (in operation S123).

Since the abnormality notification is transmitted (in operation S123) independently from the TLP data reception control after the recovery state is detected in operation S122, the abnormality notification may be unnecessarily transmitted. Furthermore, it is possible that the transmission of the normality notification and the transmission of the abnormality notification performed due to the detection of the recovery state are substantially simultaneously performed. However, since the normality notification and the abnormality notification are transmitted in a state in which the sequence number of the latest TLP which has been successfully received by the reception data processor 41 is added, this does not cause any problem. Specifically, the TLP transmission source apparatus can recognize that the TLP has been successfully transmitted when the sequence number added to the abnormality notification coincides with the sequence number of the transmitted TLP even if receiving the abnormality notification. In this case, the TLP transmission source apparatus determines that the TLP has been successfully transmitted and can complete the TLP transmission process even if receiving the abnormality notification.

Even when the abnormality notification is transmitted in operation S123 after the normality notification is transmitted in operation S115 of FIG. 6, the meaningless abnormality notification is ignored or discarded after the counterpart apparatus which receives the abnormality notification checks the sequence number added to the abnormality notification. Specifically, in a case where the normality notification (ACK DLLP) is not lost before the communication line enters the recovery state, the counterpart apparatus has received the normality notification. In this case, a sequence number the same as that added to the ACK DLLP which has been transmitted is added to the NAK DLLP to be transmitted in operation S123. Accordingly, the counterpart apparatus which receives the NAK DLLP transmitted in operation S123 determines that the sequence number added to the NAK DLLP has been previously transmitted and ignores the NAK DLLP.

When the normal/abnormality notification (DLLP) is lost before the communication line enters the recovery state, the counterpart apparatus checks the sequence number of the NAK DLLP received after the communication line is recovered from the recovery state. When the sequence number added to the NAK DLLP coincides with the sequence number of the transmitted TLP, it is determined that the TLP has been successfully transmitted and the transmission process is terminated. When the sequence number added to the NAK DLLP is smaller than the sequence number of the transmitted TLP, the TLP data is transmitted again.

As illustrated in FIGS. 5 and 6, by detecting the recovery state independently from the data transmission/reception and by transmitting the TLP data or the abnormality notification (NAK DLLP) again, even when the data is lost due to the recovery state, the transmission/reception process can be completed without detecting a time-out.

Note that the process of the transmission flow illustrated in FIG. 5 and the process of the reception flow illustrated in FIG. 6 correspond to a transmission process and a reception process, respectively, using the different serial communication lines (Tx and Rx). Accordingly, the data transmission control and the data reception control are performed independently from each other. Note that, in the flowchart illustrated in FIG. 6, operations may be performed in an arbitrary order.

Next, a case where problems are solved by the embodiment described above will be described with reference to FIGS. 7 and 8.

Figure 7:
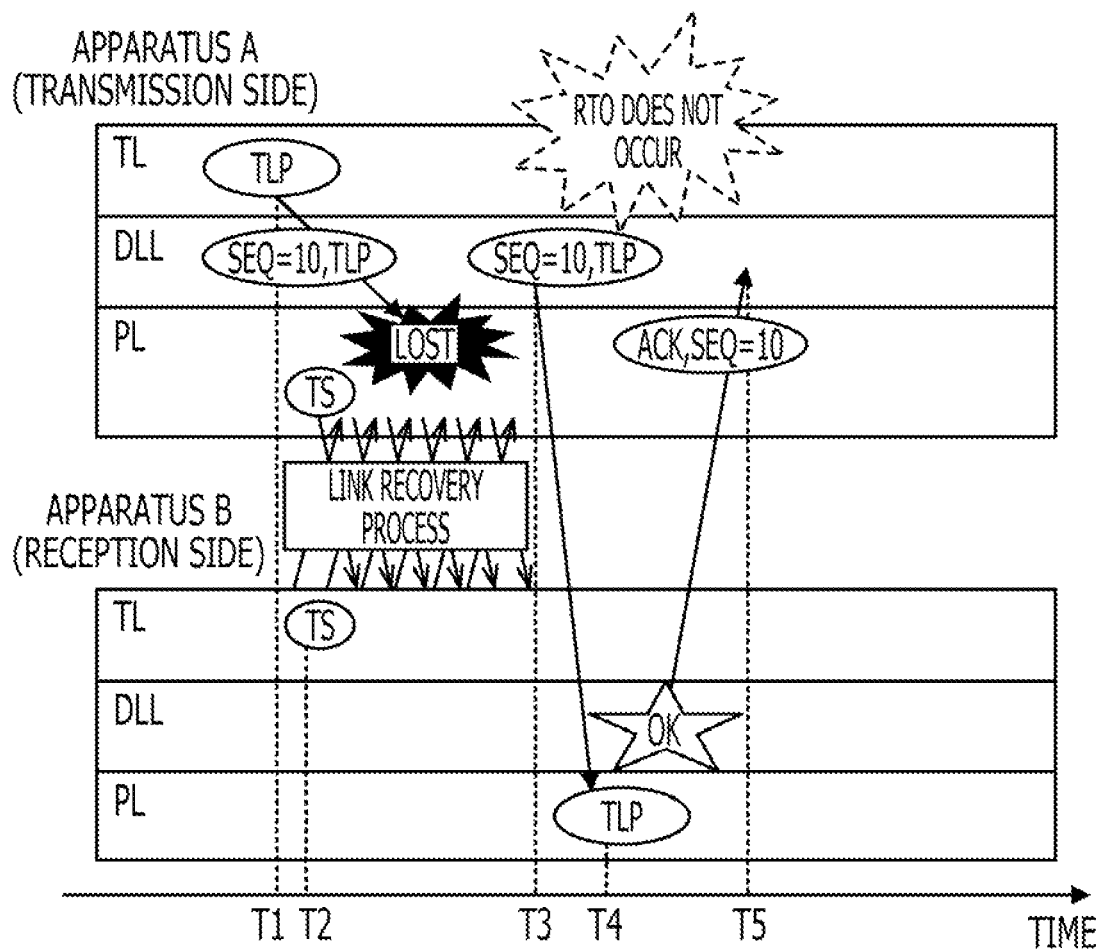
FIG. 7 illustrates a processing flow performed when transmission data (TLP) according to the embodiment is lost.
Figure 14:
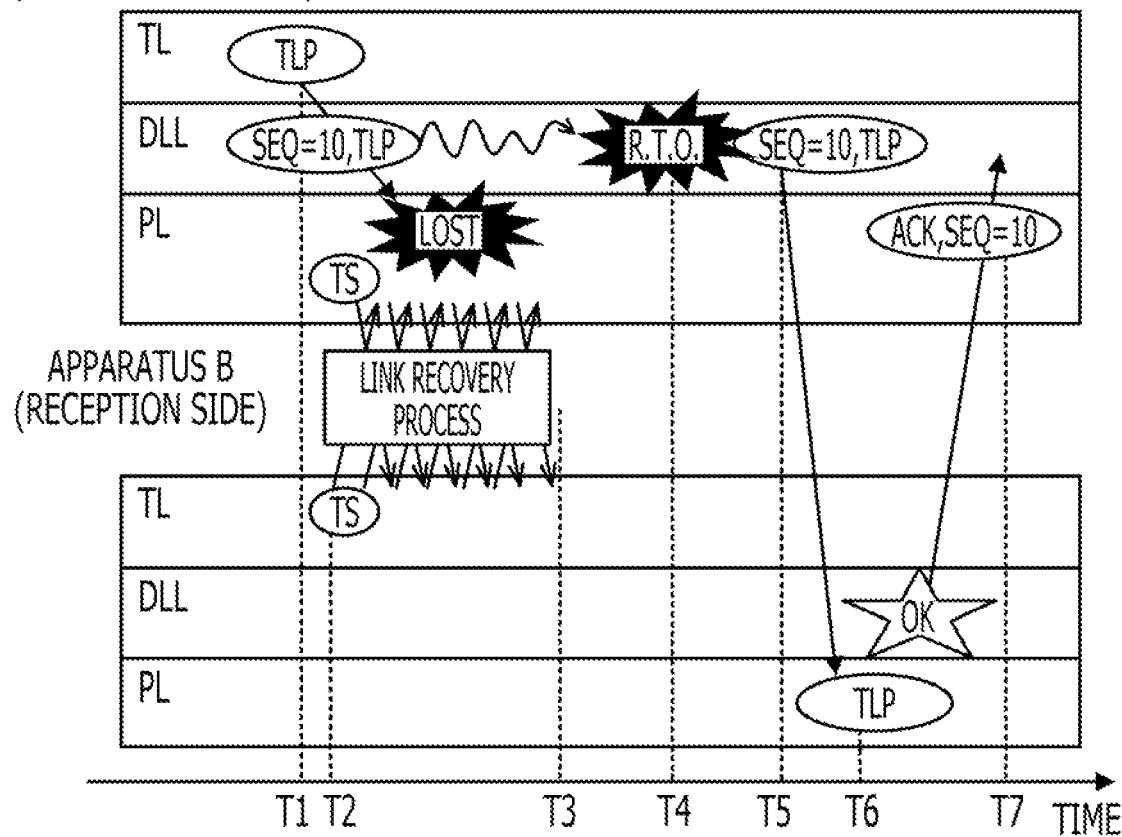
FIG. 14 illustrates a flow in a case where transmission data (TLP) is lost.

FIG. 7 illustrates a processing flow performed when a transmission TLP according to the embodiment is lost. As with the example illustrated in FIG. 14, the apparatus A transmits a TLP including a sequence number "10" added thereto to the PL section 60 of the apparatus A at a time T1. At this time, at a time T2 immediately after the time T1, the PL sections 60 included in the apparatuses A and B start performing the link recovery process on the communication line, and the TLP transmitted from the DLL of the apparatus A is discarded in the PL section 60 of the apparatus A.

However, when the PL sections 60 start the link recovery process at the time T2, the recovery-state detector 47 included in the apparatus A detects the recovery state of the communication line and instructs the re-transmission request unit 43 of the apparatus A to transmit the TLP data again. When the re-transmission request unit 43 instructs the transmission data buffer 48 to transmit the TLP again, the TLP data stored in the transmission data buffer 48 is supplied to the TLP rectifying unit 49. The TLP rectifying unit 49 adds a sequence number the same as that used when the TLP is previously transmitted to the TLP and supplies the TLP to the transmission bus arbiter 50.

The transmission bus arbiter 50 determines whether data transmission is available in accordance with information on a LINK state supplied from the PL section 60. Therefore, during a period of time from the time T2 to a time T3 in which the communication line is in the recovery state, the retransmission of the TLP is suspended. Then, since the information on the LINK state supplied from the PL section 60 represents a transmittable state after the communication line is recovered from the recovery state at the time T3, the transmission bus arbiter 50 transmits the TLP again. The TLP data transmitted again from the apparatus A is received by the apparatus B at a time T4, and a normality notification (ACK DLLP) supplied from the apparatus B is received by the apparatus A at a time T5, and then, the series of processes of the TLP transmission is terminated.

As described above, even when the transmitted TLP is lost during the link recovery process performed on the communication line in the period of time from the time T2 to the time T3, the TLP data retransmission can be completed without causing a time-out by detecting the recovery state of the communication line and transmitting the TLP data again after it is determined that the communication line has been recovered from the recovery state.

Figure 8:
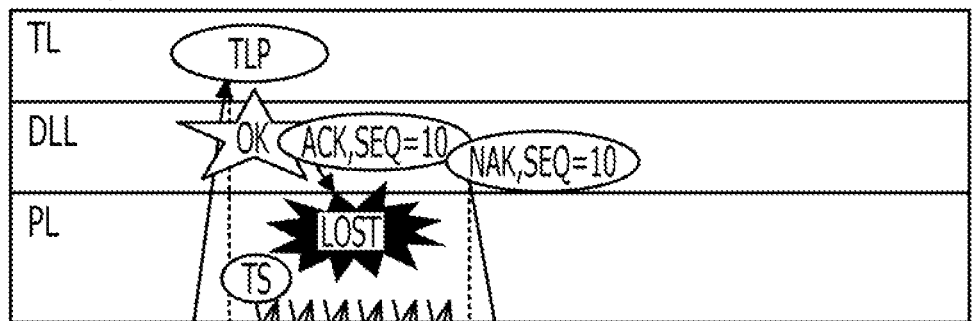
FIG. 8 illustrates a processing flow performed when a normal/abnormality notification (DLLP) according to the embodiment is lost.
Figure 8:
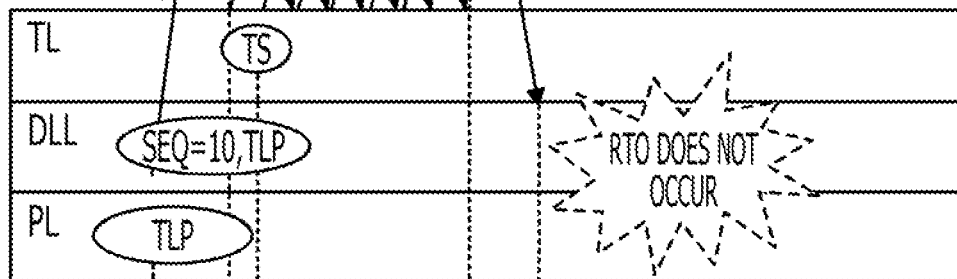
Figure 15:
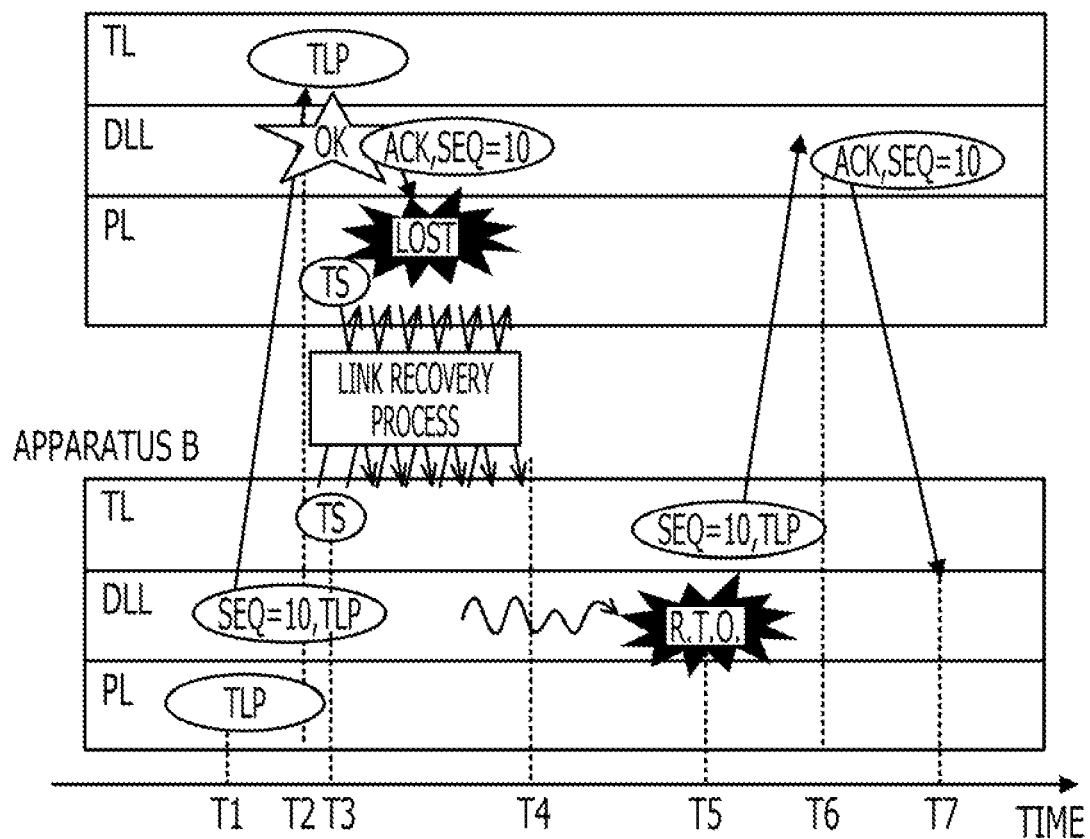
FIG. 15 illustrates a flow in a case where a normal/abnormality notification (DLLP) is lost.

FIG. 8 illustrates a processing flow performed when a normal/abnormality notification (DLLP) according to the embodiment is lost. As with the case of FIG. 15, the apparatus B transmits a TLP including a sequence number "10" added thereto to the apparatus A at a time T1. After successfully receiving the TLP at a time T2, the apparatus A transmits a normality notification (ACK DLLP) corresponding to the sequence number "10" to the apparatus B. Here, the PL sections 60 start performing the link recovery process on the communication line at a time T3 immediately after the time T2, and therefore, the normality notification transmitted from the data link layer of the apparatus A is discarded in the PL section 60.

However, when the PL sections 60 start the link recovery process at the time T3, the recovery-state detector 47 included in the apparatus A detects the recovery state of the communication line and instructs the abnormality-notification transmission unit 46 to transmit an abnormality notification. The abnormality-notification transmission unit 46 which receives the instruction from the recovery-state detector 47 transmits an abnormality notification (NAK DLLP) including the sequence number "10" of the latest TLP which has been successfully received to the transmission bus arbiter 50.

The transmission bus arbiter 50 refers to the LINK state supplied from the PL section 60 and suspends the transmission of the abnormality notification in a period of time from the time T3 to a time T4 in which the communication line is in the recovery state. Then, after it is determined that the communication line is recovered from the recovery state at the time T4, the transmission bus arbiter 50 transmits the abnormality notification and the apparatus B receives the abnormality notification at a time T5. Here, the abnormality notification received by the apparatus B includes the sequence number "10" of the latest TLP which has been successfully received by the apparatus A. Accordingly, the apparatus B can recognize that the TLP corresponding to the sequence number "10" is successfully received by the apparatus A, and determines that the retransmission of the TLP is not needed. In this way, the process of transmitting the TLP having the sequence number "10" added thereto is completed.

Even if the link recovery process is performed on the communication line after the normality notification (ACK DLLP) transmitted at the time T3 is received by the apparatus B, the abnormality notification is transmitted from the apparatus A to the apparatus B after the communication line is recovered from the recovery state. However, in this case, since the apparatus B has received the normality notification corresponding to the sequence number "10", even if another abnormality notification having the same sequence number "10" is received afterward, the other abnormality notification is ignored.

As described above, even when the normal/abnormality notification is lost in the period of time from the time T3 to the time T4 in which the link recovery process is performed on the communication line, the data retransmission can be completed without causing a time-out by detecting the recovery state of the communication line and transmitting the abnormality notification when the communication line has been recovered from the recovery state.

In the foregoing embodiment, since an abnormality notification is transmitted when the recovery state of the communication line is detected, the transmission/reception process performed after the communication line is recovered is promptly terminated. When an abnormality notification is transmitted from the TLP reception side to the TLP transmission source at the time of detection of the recovery state, even if a DLLP is lost immediately after reception of a TLP, the TLP is transmitted again in a condition in which the communication line is stable after the communication line is recovered, and accordingly, reliable data transmission is attained.

Here, when the recovery state is detected, instead of transmission of a notification, a DLLP of a preceding normality notification or a preceding abnormality notification which has been transmitted may be transmitted. In order to transmit the preceding DLLP which has been transmitted when the recovery state is detected, a result of detection performed by the recovery-state detector 47 is transmitted to the reception data processor 41 and the reception data processor 41 instructs the normality-notification transmission unit 45 or the abnormality-notification transmission unit 46 to transmit again the preceding DLLP which has been transmitted. In this case, after the time T4 of the example illustrated in FIG. 8, a normality notification represented by "ACK, SEQ=10" is transmitted again and the series of processes of the TLP transmission can be completed at the time T5.

Figure 9:
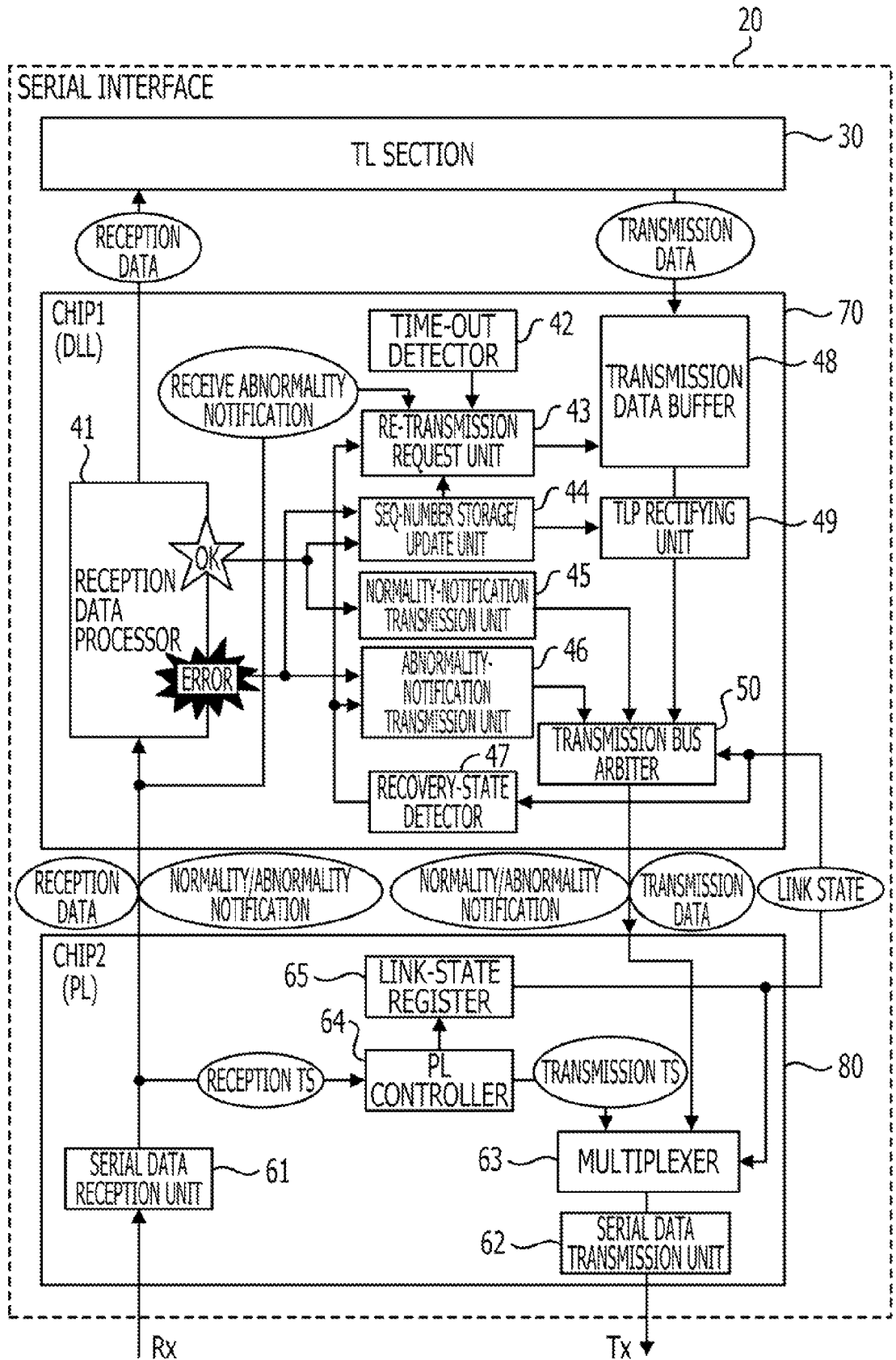
FIG. 9 is a diagram illustrating a serial transmission apparatus in which a data link layer (DLL) and a physical layer (PL) are configured as different chips.
Figure 10:
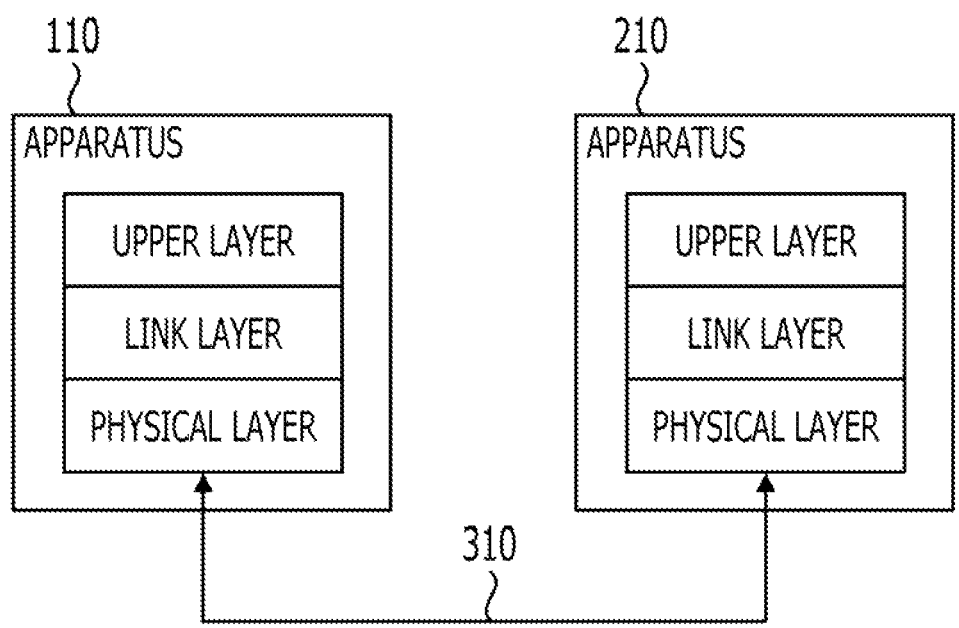
FIG. 10 illustrates a system configuration and a layer configuration in a general serial transmission method.
Figure 11:
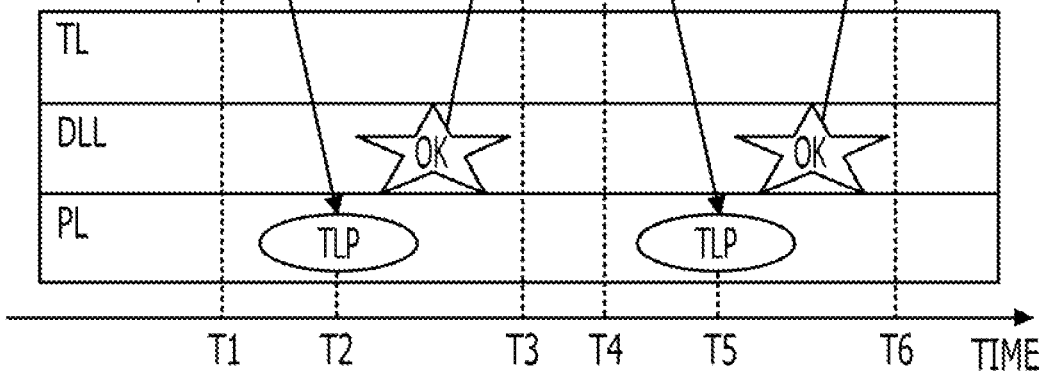
FIG. 11 illustrates a flow in a case where data transmission is successfully performed.
Figure 12:
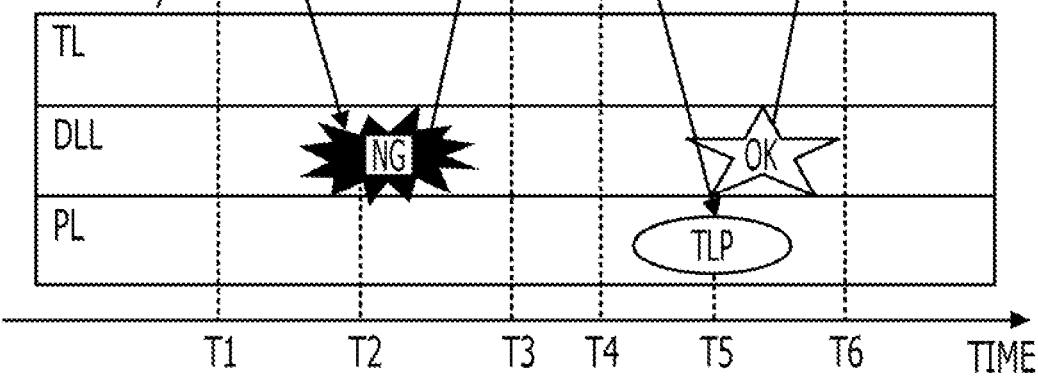
FIG. 12 illustrates a flow in a case where an error occurs in data transmission.
Figure 13:
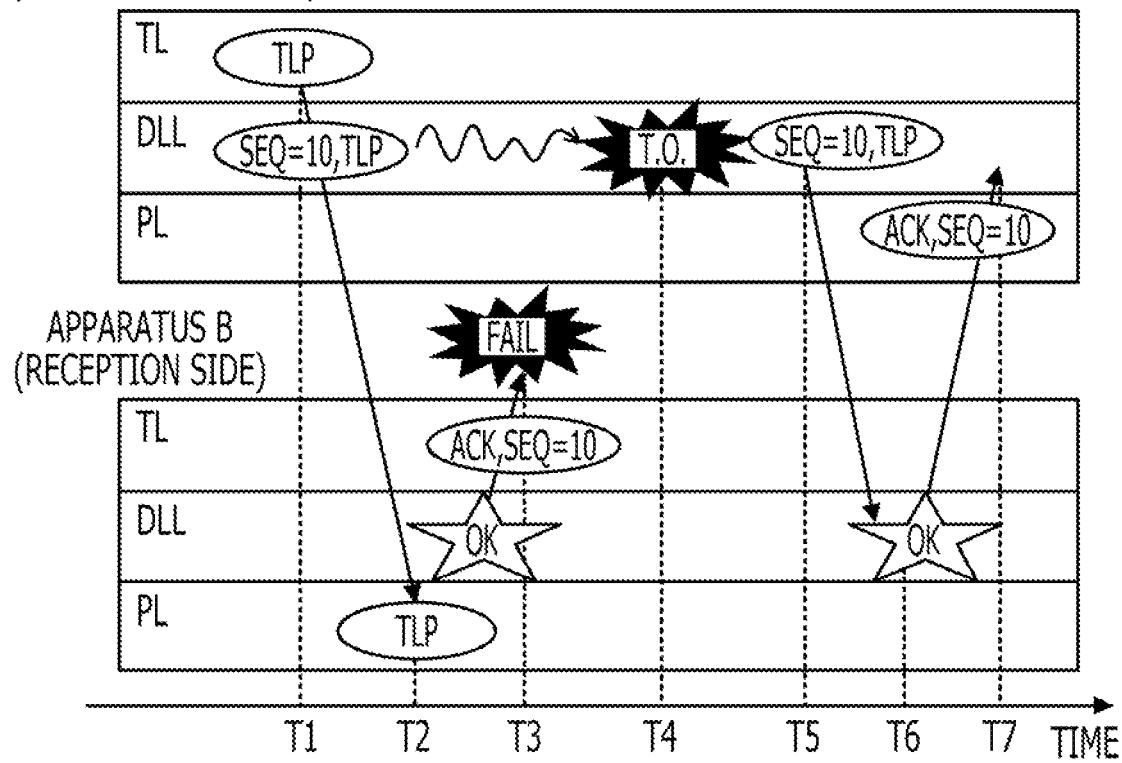
FIG. 13 illustrates a flow in a case where a time-out occurs in data transmission.

FIG. 9 illustrates a configuration of a serial transmission apparatus in which a data link layer (DLL) and a physical layer (PL) are configured as separate chips. In the example illustrated in FIG. 9, the DLL section 40 illustrated in FIG. 2 corresponds to a chip 70 and the PL section 60 illustrated in FIG. 2 corresponds to a chip 80. In sub-blocks of the chips 70 and 80, components substantially the same as those included in sub-blocks of the example illustrated in FIG. 2 are denoted by reference numerals the same as those illustrated in FIG. 2.

The chip 80 which performs a physical layer process may further include a logic circuit which performs data conversion such as serial-parallel conversion and which manages a control state as a single chip and an analog circuit which generates a differential signal of the lines Tx and Rx as another chip. Transmission and reception of a TLP and a DLLP signal between the chip 70 (DLL) and the chip 80 (PL) may be performed using a bus interface or the like, not illustrated. The information on the LINK state may be transmitted and received through the bus interface or through a dedicated bus signal line.

The chip 70 illustrated in FIG. 9 includes a recovery-state detector 47 which notifies a re-transmission request unit 43 and an abnormality-notification transmission unit 46 of a result of detection of the recovery state. Since a TLP or an NAK DLLP is transmitted again when the recovery state of the communication line is detected, a data transmission process can be completed without waiting for a time-out at a time of communication data loss.

Although the embodiments of the present invention have been described hereinabove, various modifications may be made within the scope of the present invention and the modifications are not excepted from the scope of the present invention. According to the foregoing embodiments, when an error occurs in the communication line, data transmission is promptly competed before a time-out is detected after the physical layer performs the link recovery process. Furthermore, an unnecessary time-out may be prevented from being detected.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present invention has(have) been described in detail, it should be understood that the various changes, substitutions, and alterations could be made hereto without departing from the spirit and scope of the invention.

What is claimed is:

1. A data transmission apparatus which transmits data to a data receiving apparatus through a data communication line, the data transmission apparatus comprising:
    a transmission device to transmit the data stored in a transmission data buffer to the data receiving apparatus;
    a recovery state detecting device to detect a recovery state representing that the serial communication line is in a link recovery process, and to output a first signal in accordance with detecting the recovery state; and a retransmission requesting device to receive the first signal, and to request the transmission device to retransmit the data which has been stored in the transmission data buffer in accordance with the first signal;

wherein the data are retransmitted to the data receiving apparatus after the link recovery process has been performed and the serial communication line is recovered.

2. The serial transmission apparatus according to claim 1, further comprising: an abnormality-notification transmission device to generate abnormality notification used to notify the transmission destination apparatus of detection of the recovery state of the serial communication line detected by the recovery state detecting device and causes the transmission device to transmit the abnormality notification.

3. The serial transmission apparatus according to claim 1, wherein the recovery state detecting device detects the recovery state when a signal representing a link state of the serial communication line denotes the recovery state.

4. The serial transmission apparatus according to claim 1, further comprising:

a time-out detecting device to detect a time out when a response to the transmitted data from the transmission destination apparatus is not received within a specified period of time, wherein the retransmission requesting device requests the transmission unit to retransmit the data which has been stored in the transmission data buffer when the time-out detecting device detects the time-out.

5. The data transmission apparatus according to claim 1, wherein during the recovery state, the retransmission requesting device requests the transmission device to retransmit the data, and the transmission device retransmits the data after the link recovery process has been performed and the serial communication line is recovered.

6. An information processing apparatus comprising:

a processor;

a memory configured to be connected to the processor through a bus; and a data transmission interface configured to transmit data to a data receiving apparatus through a serial communication line and configured to be connected to the processor and the memory through the bus, wherein the data transmission interface includes a transmission unit configured to transmit the data stored in a transmission data buffer to the data receiving apparatus, a recovery state detector configured to detect a recovery state representing that the serial communication line is in a link recovery process, and to output a first signal in accordance with the recovery state, and a retransmission request unit configured to receive the first signal, and to request the transmission unit to retransmit the data which has been stored in the transmission data buffer in accordance with receiving the first signal;

wherein the data are retransmitted to the data receiving apparatus after the link recovery process has been performed and the serial communication line is recovered.

7. The information processing apparatus according to claim 6, further comprising:

a time-out detector configured to detect a time out when a response to the transmitted data from the transmission destination apparatus is not received within a specified period of time, wherein the retransmission requesting device requests the transmission unit to retransmit the data which has been stored in the transmission data buffer when the time-out detector detects the time-out.

8. The information processing apparatus according to claim 6, wherein during the recovery state, the retransmission request unit requests the transmission unit to retransmit the data, and the transmission unit retransmits the data after the link recovery process has been performed and the serial communication line is recovered.

9. A data transmission method of transmitting data to a data receiving apparatus through a serial communication line using a data transmission apparatus, the data transmission method comprising:

transmitting the data stored in a transmission data buffer to the data receiving apparatus;

detecting a recovery state representing that the serial communication line is in a link recovery process, and to output a first signal in accordance with detecting the recovery state; and requesting the transmission apparatus to retransmit the data which has been stored in the transmission data buffer in accordance with the first signal;

wherein the data are retransmitted to the data receiving apparatus after the link recovery process has been performed and the serial communication line is recovered.

10. The serial transmission method according to claim 9, further comprising:

detecting a time out when a response to the transmitted data from the transmission destination apparatus is not received within a specified period of time, wherein the transmission unit retransmits the data which has been stored in the transmission data buffer when the time-out is detected.

11. The data transmission method according to claim 9, wherein:

requesting of the retransmission of the data is performed during the recovery state, and retransmitting of the data is performed after the link recovery process has been performed and the serial communication line is recovered.

12. A data transmission method of transmitting data to a data receiving apparatus through a serial communication line, the data transmission method comprising:

receiving the data transmitted through the serial communication line;

detecting a recovery state representing that the serial communication line is in a link recovery process;

generating a first signal in accordance with detecting the recovery state; and transmitting an abnormality-notification indicating abnormal condition to a first apparatus in accordance with the first signal; and after the link recovery process has performed and the serial communication line is recovered, retransmitting the data from the first apparatus to the data receiving apparatus in accordance with the abnormality-notification.

13. The data transmission method according to claim 12, further comprising:

requesting retransmission of the data during the recovery state, wherein retransmitting of the data is performed after the link recovery process has been performed and the serial communication line is recovered.

* * * * *